(12) United States Patent
Isono et al.

(10) Patent No.: US 10,270,956 B2
(45) Date of Patent: Apr. 23, 2019

(54) INTERCHANGEABLE LENS AND CAMERA BODY

(71) Applicant: NIKON CORPORATION, Tokyo (JP)

(72) Inventors: Kenji Isono, Yokohama (JP); Natsuki Shirai, Kawasaki (JP); Takashi Shimizu, Kawaguchi (JP)

(73) Assignee: NIKON CORPORATION, Tokyo (JP)

( * ) Notice: Subject to any disclaimer, the term of this patent is extended or adjusted under 35 U.S.C. 154(b) by 204 days.

(21) Appl. No.: 14/424,857

(22) PCT Filed: Aug. 21, 2013

(86) PCT No.: PCT/JP2013/072281
§ 371 (c)(1),
(2) Date: Feb. 27, 2015

(87) PCT Pub. No.: WO2014/034488
PCT Pub. Date: Mar. 6, 2014

(65) Prior Publication Data
US 2015/0215515 A1 Jul. 30, 2015

(30) Foreign Application Priority Data

Aug. 31, 2012 (JP) ................................ 2012-191979
Dec. 10, 2012 (JP) ................................ 2012-269590

(51) Int. Cl.
*H04N 5/232* (2006.01)
*G03B 17/02* (2006.01)
(Continued)

(52) U.S. Cl.
CPC ......... *H04N 5/23209* (2013.01); *G03B 13/36* (2013.01); *G03B 17/02* (2013.01);
(Continued)

(58) Field of Classification Search
CPC ............. H04N 5/23209; H04N 5/2254; H04N 5/23203; H04N 5/23222; G03B 17/02; G03B 17/14; G03B 2206/00
See application file for complete search history.

(56) References Cited

U.S. PATENT DOCUMENTS 5,198,850 A  3/1993 Saegusa
5,434,637 A  7/1995 Ohta
(Continued)

FOREIGN PATENT DOCUMENTS

CN  102263895 A  11/2011
CN  102263984 A  11/2011
(Continued)

OTHER PUBLICATIONS

Apr. 30, 2014 Office Action issued in Japnese Application No. 2014-023665.
(Continued)

*Primary Examiner* — Antoinette T Spinks
(74) *Attorney, Agent, or Firm* — Oliff PLC

(57) ABSTRACT

An interchangeable lens includes: a mount unit on which a camera body can be mounted; a driven member; a drive unit that drives the driven member; a storage unit that stores lens data related to driving of the driven member by the drive unit; and a transmitter that sends lens-side judgment data, based on which whether the lens data is properly stored in the storage unit can be judged at the camera body, to the camera body.

9 Claims, 16 Drawing Sheets

(51) Int. Cl.
*G03B 17/14* (2006.01)
*G03B 13/36* (2006.01)
*H04N 5/225* (2006.01)

(52) U.S. Cl.
CPC .......... *G03B 17/14* (2013.01); *H04N 5/2254* (2013.01); *H04N 5/23203* (2013.01); *H04N 5/23222* (2013.01); *G03B 2206/00* (2013.01)

(56) References Cited

U.S. PATENT DOCUMENTS

| | | | |
|---|---|---|---|
| 5,608,488 A | | 3/1997 | Hirai et al. |
| 5,630,180 A | * | 5/1997 | Kusaka .................. G03B 17/14 396/63 |
| 5,839,002 A | | 11/1998 | Miyake et al. |
| 2008/0199174 A1 | * | 8/2008 | Yoshida .................. G03B 7/095 396/257 |
| 2011/0292225 A1 | | 12/2011 | Toshiro |
| 2011/0292238 A1 | | 12/2011 | Katsumata |
| 2013/0176480 A1 | | 7/2013 | Makigaki |
| 2014/0184893 A1 | * | 7/2014 | Imafuji .................. G03B 17/14 348/360 |

FOREIGN PATENT DOCUMENTS

| | | |
|---|---|---|
| JP | H02205829 A | 8/1990 |
| JP | H03220533 A | 9/1991 |
| JP | H0455836 A | 2/1992 |
| JP | H05313062 A | 11/1993 |
| JP | H07175102 A | 7/1995 |
| JP | H0850229 A | 2/1996 |
| JP | 2002-040533 A | 2/2002 |
| JP | 2006208897 A | 8/2006 |
| JP | 2008-233889 A | 10/2008 |
| JP | 2009175622 A | 8/2009 |
| JP | 2011250221 A | 12/2011 |
| JP | 2012018222 A | 1/2012 |

OTHER PUBLICATIONS

Oct. 4, 2016 Office Action issued in Japanese Application No. 2014-077306.
Aug. 2, 2016 Search Report issued in European Application No. 13832373.8.
Sep. 24, 2013 International Search Report issued in International Application No. PCT/JP2013/072281.
Jun. 13, 2017 Office Action issued in Chinese Patent Application No. 201380045539.2.
Jun. 6, 2017 Office Action issued in Japanese Application No. 2014-077306.
English-language machine translation of JP H02-205829 A, published Aug. 15, 1990.
English-language machine translation of JP H03-220533 A, published Sep. 27, 1991.
Dec. 5, 2017 Office Action issued in Japanese Application No. 2016-215344.
Nov. 12, 2018 Office Action issued in Indian Application No. 2457/DELNP/2015.

* cited by examiner

INTERCHANGEABLE LENS AND CAMERA BODY

TECHNICAL FIELD

The present invention relates to an interchangeable lens and a camera body.

BACKGROUND ART

Conventionally, an interchangeable lens capable of calculating aperture drive time has been known with a camera system of a so-called single-lens reflex type. For example, Patent Literature 1 describes a configuration in which a lens microcomputer in an interchangeable lens calculates the aperture drive time based on aperture speed information stored in an internal memory in advance and driving amount information received from a camera microcomputer.

CITATION LIST

Patent Literature

PATENT LITERATURE 1: Japanese Laid Open Patent Publication No. 2006-208897

SUMMARY OF INVENTION

Technical Problem

The conventional technology has a problem of the inability to properly control driving of a driven member when information which is stored in a storage medium inside the interchangeable lens in advance is damaged due to, for example, strong electric impacts.

Solution to Problem

An interchangeable lens according to a first aspect of the present invention comprises: a mount unit on which a camera body can be mounted; a driven member; a drive unit that drives the driven member; a storage unit that stores lens data related to driving of the driven member by the drive unit; and a transmitter that sends lens-side judgment data, based on which whether the lens data is properly stored in the storage unit can be judged at the camera body, to the camera body.

According to a second aspect of the present invention, in the interchangeable lens according to the first aspect, it is preferable that the lens-side judgment data is generated based on the lens data stored in the storage unit.

According to a third aspect of the present invention, in the interchangeable lens according to the first or second aspect, it is preferable to further comprise: an estimation unit that estimates drive time required for the drive unit to drive the driven member by a desired driving amount at a desired drive speed based on the lens data stored in the storage unit.

According to a fourth aspect of the present invention, in the interchangeable lens according to the third aspect, it is preferable that the transmitter sends the drive time estimated by the estimation unit as the lens-side judgment data to the camera body.

According to a fifth aspect of the present invention, in the interchangeable lens according to the fourth aspect, it is preferable that the lens data includes an operation expression to calculate the drive time by using at least the desired drive speed and the desired driving amount; and the estimation unit estimates the drive time by calculation processing that uses the operation expression.

According to a sixth aspect of the present invention, in the interchangeable lens according to the fifth aspect, it is preferable that the lens data includes a simple operation expression to calculate the drive time by using only the desired drive speed and the desired driving amount; and the estimation unit estimates the drive time by calculation processing that uses the simple operation expression.

According to a seventh aspect of the present invention, in the interchangeable lens according to the fifth or sixth aspect, it is preferable that the estimation unit calculates the drive time by changing at least one of values of the drive speed and the driving amount every time the calculation is performed.

According to an eighth aspect of the present invention, in the interchangeable lens according to the fifth aspect, it is preferable that the storage unit stores the lens data including at least one of the operation expression of the drive time and correction term data given to the operation expression of the drive time; and the transmitter sends at least part of the correction term data as data related to the lens-side judgment data to the camera body.

According to a ninth aspect of the present invention, in the interchangeable lens according to the fifth or sixth aspect, it is preferable that the estimation unit calculates a plurality of drive times by executing the calculation processing to calculate the drive time every time the estimation unit receives a combination of the desired drive speed and the desired driving amount; and the transmitter sends information about the plurality of drive times calculated by the calculation processing as the lens-side judgment data to the camera body.

According to a tenth aspect of the present invention, in the interchangeable lens according to the third aspect, it is preferable that the transmitter sends at least part of the lens data stored in the storage unit as the lens-side judgment data to the camera body.

According to an eleventh aspect of the present invention, in the interchangeable lens according to the tenth aspect, it is preferable that the storage unit stores the lens data including at least one of an operation expression of the drive time and a parameter given to the operation expression of the drive time.

According to a twelfth aspect of the present invention, in the interchangeable lens according to any one of the first to eleventh aspects, it is preferable to further comprise: an optical system including the driven member, wherein: the driven member includes any one of a member capable of moving along an optical axis of the optical system, a member capable of moving in a direction including a component perpendicular to the optical axis, and a member capable of moving so as to change a size of an opening through which a light flux passes.

A camera body according to a thirteenth aspect of the present invention comprise: mount unit on which an interchangeable lens including a driven member and a storage medium storing lens data related to driving of the driven member can be mounted; a receiver that receives lens-side judgment data, based on which whether the lens data is properly stored in the storage medium or not can be judged, from the interchangeable lens; and a judgment unit that judges whether the lens data is properly stored in the storage medium or not, based on the lens-side judgment data received from the receiver.

According to a fourteenth aspect of the present invention, in the camera body according to the thirteenth aspect, it is preferable that the receiver receives the lens-side judgment data generated based on the lens data stored in the storage medium.

According to a fifteenth aspect of the present invention, in the camera body according to the thirteenth or fourteenth aspect, it is preferable that the receiver receives drive time, which is required to drive the driven member by a desired driving amount at a desired drive speed and is estimated by the interchangeable lens based on the lens data, as the lens-side judgment data from the interchangeable lens.

According to a sixteenth aspect of the present invention, in the camera body according to the fifteenth aspect, it is preferable to further comprise: a storage unit that stores body-side data to be compared with the lens-side judgment data received from the receiver, wherein: the judgment unit performs the judgment based on the body-side data and the lens-side judgment data received from the receiver.

According to a seventeenth aspect of the present invention, in the camera body according to the sixteenth aspect, it is preferable that the body-side data comprises data associating information about drive time required to drive the driven member by a desired driving amount at a desired drive speed with the desired drive speed and the desired driving amount.

According to an eighteenth aspect of the present invention, in the camera body according to the seventeenth aspect, it is preferable that the storage unit stores a plurality of pieces of the body-side data which are mutually different; and the judgment unit selects one of the plurality of pieces of the body-side data stored in the storage unit and performs the judgment by comparing the information about the drive time included in the selected body-side data with the received lens-side judgment data.

According to a nineteenth aspect of the present invention, in the camera body according to the fifteenth aspect, it is preferable to further comprise: a storage unit that stores body-side data which is partially identical to the lens data stored in the storage medium; and an estimation unit that estimates drive time required to drive the driven member by the desired driving amount at the desired drive speed based on the body-side data stored in the storage unit, wherein: the judgment unit judges whether the lens data is properly stored in the storage medium or not, by comparing the drive time estimated by the estimation unit with the lens-side judgment data received from the receiver.

According to a twentieth aspect of the present invention, in the camera body according to the nineteenth aspect, it is preferable that the storage unit stores the lens data including an operation expression of the drive time.

According to a twenty-first aspect of the present invention, in the camera body according to the fifteenth aspect, it is preferable that the storage unit stores an operation expression same as an operation expression stored in the storage medium to calculate the drive time; the receiver receives at least part of correction term data, which is stored in the storage medium and given to the operation expression to calculate the drive time, from the storage medium; the estimation unit calculates the drive time based on the correction term data received from the receiver and the operation expression; and the judgment unit performs the judgment based on the drive time calculated by the estimation unit and the lens-side judgment data received by the receiver.

According to a twenty-second aspect of the present invention, in the camera body according to the fifteenth aspect, it is preferable that the receiver receives a plurality of drive times as the lens-side judgment data, each of the plurality of drive times corresponding to the drive time; and the judgment unit performs the judgment based on a size relation between the plurality of drive times received by the receiver.

According to a twenty-third aspect of the present invention, in the camera body according to the thirteenth or fourteenth aspect, it is preferable that the receiver receives at least part of the lens data stored in the storage medium as the lens-side judgment data from the interchangeable lens.

Advantageous Effect of the Invention

Driving of the driven member can be controlled with excellent precision and certainty according to the present invention.

BRIEF DESCRIPTION OF THE DRAWINGS

FIG. 2 shows a schematic sectional view of a camera body 100 and a first interchangeable lens 200a;

FIG. 6 shows a flowchart illustrating initialization processing executed by a first lens control device 209a;

DESCRIPTION OF EMBODIMENTS

First Embodiment

Figure 1:
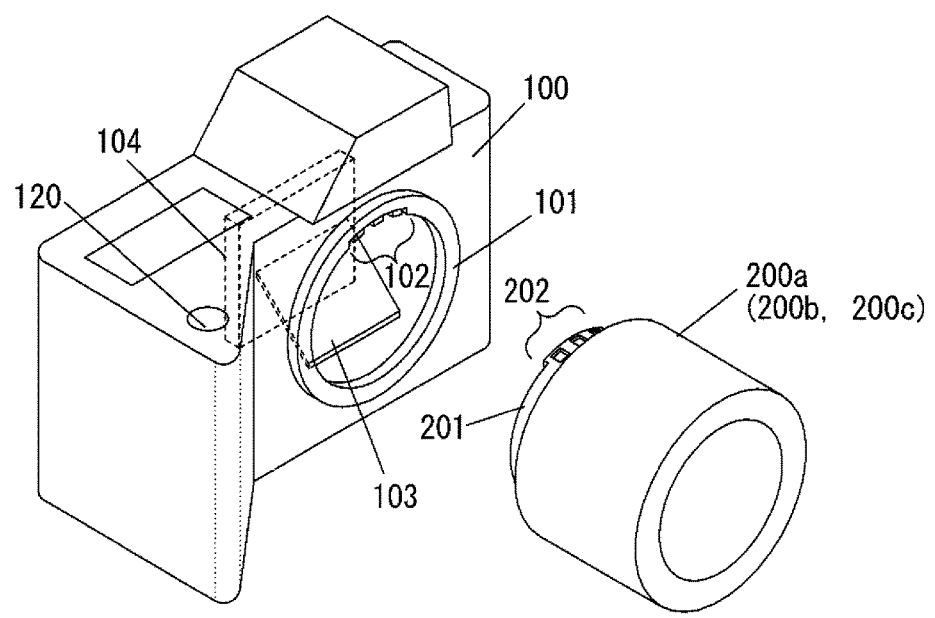
FIG. 1 shows a perspective view of the configuration of a camera system according to a first embodiment.

A camera system according to a first embodiment, to which the present invention is applied, will be explained below with reference to drawings. FIG. 1 shows a perspective view of the configuration of the camera system according to the first embodiment. The digital camera system illustrated in FIG. 1 is configured by including a camera body 100 and a first interchangeable lens 200a which can be mounted on the camera body 100. Incidentally, besides the first interchangeable lens 200a, a second interchangeable lens 200b or a third interchangeable lens 200c can be mounted on the camera body 100. Differences between these three kinds of interchangeable lenses 200a, 200b and 200c will be described later.

The camera body 100 includes a so-called bayonet-type body mount unit 101. Once a lens mount unit 201 for the first interchangeable lens 200a is set in and secured to the body mount unit 101, a plurality of electric contacts 202 provided on the lens mount unit 201 are electrically connected to a plurality of electric contacts 102 provided on the body mount unit 101. The camera body 100 is also provided with a release switch 120 capable of halfway press operation and full press operation.

(Description of Digital Camera System Made Up of Camera Body 100 and First Interchangeable Lens 200a)

Figure 2:
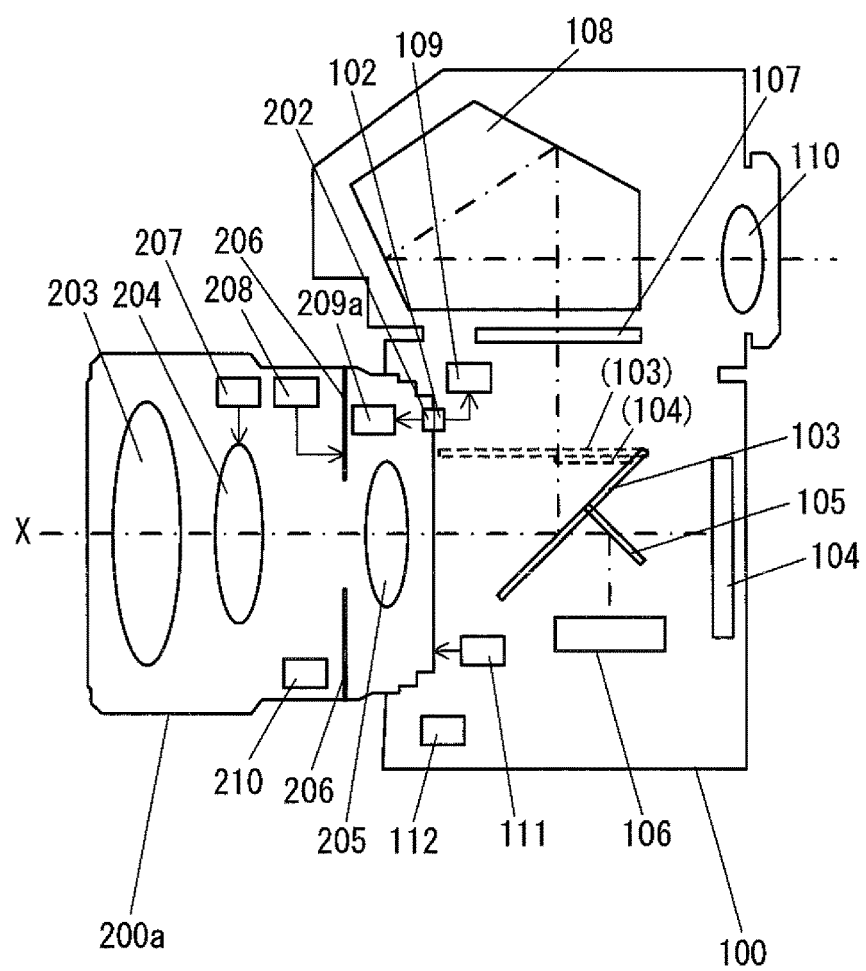

FIG. 2 is a schematic sectional view of the camera body 100 and the first interchangeable lens 200a. The first interchangeable lens 200a includes an image forming optical system that forms a subject image on an imaging surface when receiving a light flux from a subject. This image forming optical system is composed of a plurality of lenses 203, 204 and 205 and an aperture 206. Of these lenses, the lens 204 is a focusing lens capable of moving in a direction of an optical axis X. The camera body 100 includes an image sensor 104 that captures the subject image formed by the image forming optical system, converts the subject image into an electric signal, and outputs the electric signal. The image sensor 104 is a solid-state image sensor such as a CCD or a CMOS. It should be noted that an infrared cut-off filter to cut off infrared light and an optical low-pass filter to prevent aliasing noise of images are disposed on the imaging surface of the image sensor 104 although they are not shown in FIG. 2.

A quick return mirror 103 is disposed on an optical path of the light flux, which has transmitted through the image forming optical system, in a manner so as to shield the image sensor 104 in the camera body 100. The quick return mirror 103 is located at a position indicated with a solid line in FIG. 2 before exposure (while not photographing), so that it reflects the subject light from the image forming optical system onto a finder screen 107 located in an upper part of the camera body 100. The finder screen 107 is located at a conjugated position with the image sensor 104 relative to the quick return mirror 103.

The subject light which has been reflected by a reflecting surface of the quick return mirror 103 transmits through the finder screen 107, is introduced into a pentaprism 108 (pentagonal roof prism), and is then output towards an ocular lens 110. Therefore, in a pre-exposure state, a photographer can visually recognize the subject image through the ocular lens 110.

An area near the center of the quick return mirror 103 (including the optical axis X of the optical system and its vicinity) constitutes a half mirror and part of the subject light transmits through this half mirror part. The light flux thus transmitted is reflected by a sub-mirror 105 provided on the backside of the quick return mirror 103 and enters a focal point detector 106 provided in a lower part of the camera body 100. The focal point detector 106 detects a focusing state of the image forming optical system.

For the exposure, the quick return mirror 103 and the sub-mirror 105 are moved to a position (retracted position) below the finder screen 107. Once the quick return mirror 103 and the sub-mirror 105 have moved to the retracted position, the subject light which has transmitted through the image forming optical system is introduced into the image sensor 104. Subsequently, the image sensor 104 captures the subject image formed on the imaging surface.

The first interchangeable lens 200a includes a first lens control device 209a that controls each part of the first interchangeable lens 200a. Moreover, the camera body 100 includes a body control device 109 that controls each part of the camera body 100. The first lens control device 209a and the body control device 109 can perform bi-directional data communication by sending and receiving electric signals via the plurality of electric contacts 102, 202 provided on the respective mount units of the camera body and the interchangeable lens.

The first interchangeable lens 200a includes: a lens drive unit 207 that drives the focusing lens 204 in a direction along the optical axis X; and an aperture drive unit 208 that drives the aperture 206 to change the size of an opening through which the subject light passes. Each of the lens drive unit 207 and the aperture drive unit 208 includes an actuator (not shown in the drawing) (such as a stepping motor), and the lens drive unit 207 and the aperture drive unit 208 drive the focusing lens 204 and the aperture 206, respectively, according to a drive speed, driving amount, and drive direction given from the first lens control device 209a.

The camera body 100 includes a body side aperture drive unit 111 equipped with an actuator (not shown in the drawing). When an interchangeable lens (described later) which is not equipped with a drive mechanism for the aperture 206 is mounted, the body side aperture drive unit 111 transmits a driving force by the actuator to the aperture 206 in the interchangeable lens and drives the aperture 206. Since the first interchangeable lens 200a shown in FIG. 2 is equipped with the aperture drive unit 208, the body side aperture drive unit 111 does nothing when the first interchangeable lens 200a is mounted.

The first interchangeable lens 200a includes a ROM 210 which is a nonvolatile storage medium. The lens-side ROM 210 stores lens data (described later in detail) about driving of the aperture 206. Similarly, the camera body 100 includes a body-side ROM 112 which is a nonvolatile storage medium. Body-side judgment data (body-side data) (described later in detail) based on which whether the lens data is properly stored in the lens-side ROM 210 described later is judged is stored in the body-side ROM 112 in advance.

The first lens control device 209a sends to the body control device 109 lens-side judgment data, which enables the camera body 100 (the body control device 109) to judge whether the lens data is properly stored in the lens-side ROM 210 or not, based on the lens data (described later in detail) stored in the lens-side ROM 210. The body control device 109 judges whether the lens data is properly stored in the lens-side ROM 210 or not by comparing the body-side judgment data (or body-side data) stored in the body-side ROM 112 with the above-described received lens-side judgment data. This judgment will be explained later in detail.

(Description of Driving of Aperture)

Before having the interchangeable lens 200 start controlling driving of the aperture, the body control device 109 firstly identifies what kind of interchangeable lens is mounted on the body mount unit 101 (the type of the interchangeable lens), by means of initial communication with the interchangeable lens 200 via the aforementioned electric contacts 102 and 202. The body control device 109 identifies whether it is the first interchangeable lens 200a, the second interchangeable lens 200b, or the third interchangeable lens 200c, based on the content of the lens data acquired from the interchangeable lens 200 through the initial communication (or based on, for example, whether the lens data has been acquired or not).

This first embodiment will be described below about a case where (the body control device 109 determines that) the first interchangeable lens 200a is mounted on the body mount unit 101.

When it is necessary to change an opening diameter of the aperture 206, for example, for exposure, the body control device 109 sends an aperture drive command to the first lens control device 209a through data communication via the plurality of electric contacts 102 and 202. After receiving the aperture drive command from the body control device 109, the first lens control device 209a controls the aperture drive unit 208 in accordance with parameters of the aperture drive command and has the aperture drive unit 208 drive the aperture 206.

The aperture drive command includes the parameters which represent the driving amount, drive direction, and drive speed of the aperture 206. For example, assuming that the opening diameter of the current aperture 206 is of a size corresponding to F2 and this needs to be changed to a size corresponding to F4, the body control device 109 sends the aperture drive command to the first lens control device 209a in order to set the driving amount to an amount corresponding to "2 steps," the drive direction to a "constricting direction," and the drive speed to a "highest speed." When receiving the aperture drive command to set the drive speed to the "highest speed" from the body control device 109, the lens control device 209a for the interchangeable lens 200a controls and drives the aperture 206 to a target aperture position (by the driving amount) at the maximum aperture drive speed which the interchangeable lens 200a (the aperture drive unit 208) can operate.

Incidentally, if the driving amount of the aperture 206 is defined as the "number of aperture steps from the maximum aperture," it is unnecessary to include the parameter, which represents the "drive direction," independently from the above-mentioned "driving amount" in the "aperture drive command".

The body control device 109 usually designates the "highest speed" as the drive speed of the aperture 206. However, the body control device 109 sends the aperture drive command, which designates a value other than the "highest speed" as the drive speed, to the first lens control device 209a in any of the following circumstances: (1) if power consumption of the first interchangeable lens 200a needs to be suppressed; (2) if operation sound of the first interchangeable lens 200a needs to be reduced; or (3) if the aperture 206 is to be driven while photographing a moving image.

The case (1) where "power consumption of the first interchangeable lens 200a needs to be suppressed" means, for example, when remaining battery power is low or when a user designates power-saving operation. The case (2) where the "operation sound of the first interchangeable lens 200a needs to be reduced" means, for example, when the sound is recorded at the same time as photographing or when the user designates silent operation. The case (3) where the "aperture 206 is to be driven while photographing a moving image" means, for example, when the user designates to photograph such a moving image.

The body control device 109 sends an aperture drive time estimate command to the first lens control device 209a before sending the above-described aperture drive command.

Now, the "aperture drive time estimate command" which is output from the camera body 100 to the interchangeable lens 200 will be explained. The aperture drive time estimate command is a command for instructing, the interchangeable lens 200 (the first lens control device 209a) to estimate a drive time required when the aperture drive unit 208 at the interchangeable lens 200 is controlled to drive the aperture 206 by the aperture driving amount (the number of steps) designated by the camera body 100 at the aperture drive speed also designated by the camera body 100 (for example, by means of forecasting calculation) and to output (or send) the result of the estimate (for example, the forecasting calculation) to the camera body 100.

After receiving the estimated result (estimated drive time of the aperture), the camera body (the body control device 109) uses the estimated drive time for timing control related to photographing operation, for example, timing control related to the exposure processing. Examples of timing control of the exposure processing include timing control of opening and closing of a shutter when photographing still images and timing control of photographic sensitivity to change the photographic sensitivity according to movements of the aperture so that changes in the exposure may not occur (or a constant exposure amount may be maintained) even if an aperture value (aperture opening size) is changed when photographing a moving image.

After receiving the aperture drive time estimate command from the body control device 109, the first lens control device 209a estimates (or calculates) time required to drive the aperture 206 based on the content of the aperture drive time estimate command (at least including an aperture driving amount a and an aperture drive speed v). Then, the first lens control device 209a sends (or returns) the estimated (or calculated) drive time to the body control device 109.

The first lens control device 209a estimates the drive time based on the lens data stored in the lens-side ROM 210. Now, the lens data in the lens-side ROM 210 will be explained. The lens-side ROM 210 includes an operation expression to calculate the estimated drive time T from the aperture driving amount a and the aperture drive speed v mentioned above, as the lens data. An example of that operation expression is indicated as the following expression (1):

$$T = a/v + \alpha \qquad (1)$$

In the above expression, a represents a correction term for the aperture drive time and is decided in consideration of, for example, delay time from the start of drive control of the aperture 206 until actual start of driving of the aperture 206 and time it takes from when the aperture 206 is driven by a target driving amount until the aperture 206 becomes static and stable. A different value is stored as this correction term $\alpha$ for each interchangeable lens. Furthermore, a different value may be stored as the correction term $\alpha$ according to lens setting conditions (for example, according to a focal length in a case of zoom lens) depending on the type of the interchangeable lens. The lens data of the lens-side ROM 210 also includes the value of this correction term $\alpha$ and that value is decided when designing the first interchangeable lens 200a. For example, if the aperture driving amount a is "2 steps," the aperture drive speed v is "10 steps/second," and the correction term $\alpha$ is "0.1 seconds," the first lens control device 209a calculates the estimated drive time T as 0.3 seconds according to the aforementioned expression (1). Incidentally, a plurality of correction terms a may be stored (or provided) according to the drive speed and the driving amount (or the number of steps).

The body control device 109 controls, for example, shutter release timing for still image photographing based on the estimated drive time T estimated as explained above.

(Description of Digital Camera System Made Up of Camera Body 100 and Second Interchangeable Lens 200b)

Figure 3:
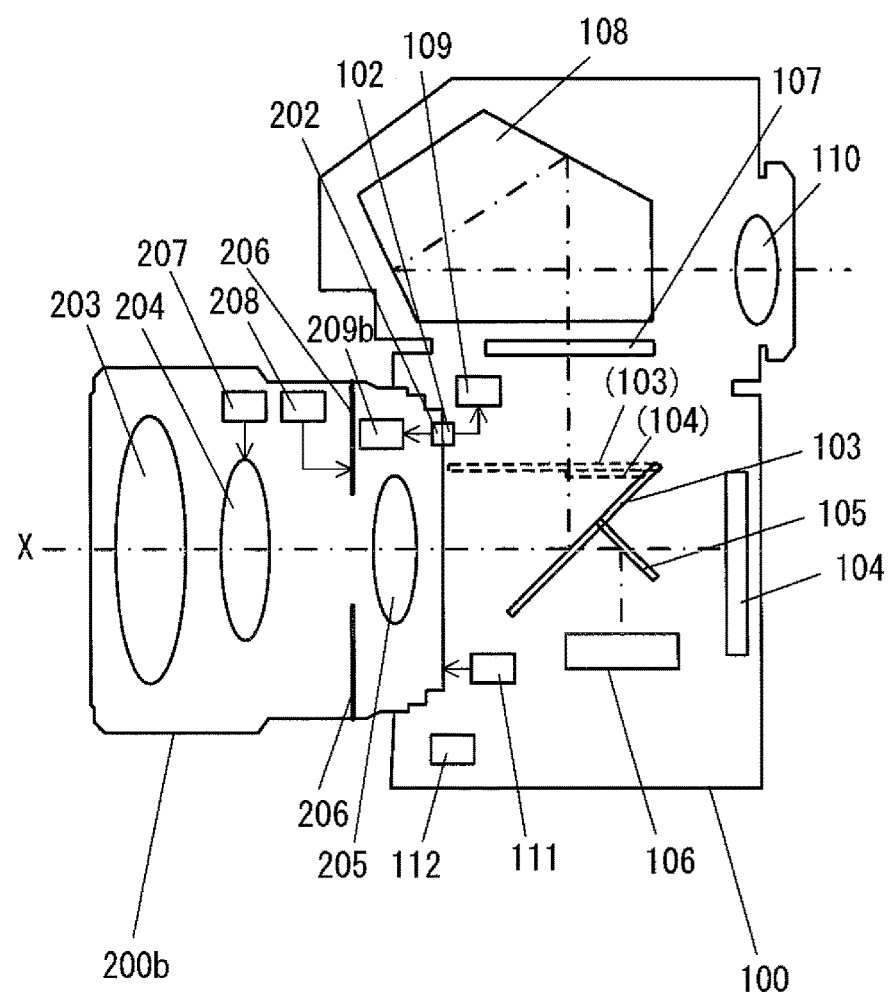
FIG. 3 shows a schematic sectional view of the camera body 100 and a second interchangeable lens 200b.

FIG. 3 is a schematic sectional view of the camera body 100 and the second interchangeable lens 200b. Differences between the second interchangeable lens 200b and the first interchangeable lens 200a will be explained below.

The second interchangeable lens 200b includes a second lens control device 209b instead of the first lens control device 209a.

The body control device 109 firstly performs initial communication with the second lens control device 209b via the aforementioned electric contacts 102 and 202 and identifies, based on the communication results, that the second interchangeable lens 200b is mounted on the body mount unit 101.

The second lens control device 209b, unlike the first lens control device 209a, does not support any designation of the drive speed of the aperture 206. Therefore, the body control device 109 sends an aperture drive command whose content is different from that of the aforementioned aperture drive command (which is sent to the first lens control device 209a), that is, the aperture drive command which does not include the aperture drive speed, to the second lens control device 209b.

After receiving the aperture drive command sent from the body control device 109, the second lens control device 209b, like the first lens control device 209a, controls the aperture drive unit 208 and has the aperture drive unit 208 drive the aperture 206 in accordance with the content of the aperture drive command. However, since the aperture drive command does not include any designation of the aperture drive speed, the aperture 206 is always driven at a specified speed (for example, the highest possible speed of the second interchangeable lens 200b) when the second interchangeable lens 200b is mounted on the camera body 100.

Furthermore, the second lens control device 209b does not perform estimation (or calculation) of the drive time of the aperture 206 which was performed in the aforementioned first interchangeable lens 200a. Moreover, the second interchangeable lens 200b does not include the lens-side ROM 210 which stores the aforementioned lens data.

Meanwhile, the aperture drive commands are not limited to the example explained above (the example in which the first interchangeable lens 200a and the second interchangeable lens 200b use mutually different commands) and, for example, the first interchangeable lens 200a and the second interchangeable lens 200b can share an aperture drive command output by the body control device 109. If such a shared aperture drive command is to be used, the second lens control device 209b may be configured so that it refers to the parameters representing the driving amount and the drive direction of the aperture 206 and included in the aperture drive command, but does not refer to the parameter representing the drive speed of the aperture 206. As the second lens control device 209b is configured in this way, when the second interchangeable lens 200b is mounted on the camera body 100 in the same manner, the aperture 206 will be always driven at a specified speed (for example, at the highest speed) as described above.

(Description of Digital Camera System Made Up of Camera Body 100 and Third Interchangeable Lens 200c)

Figure 4:
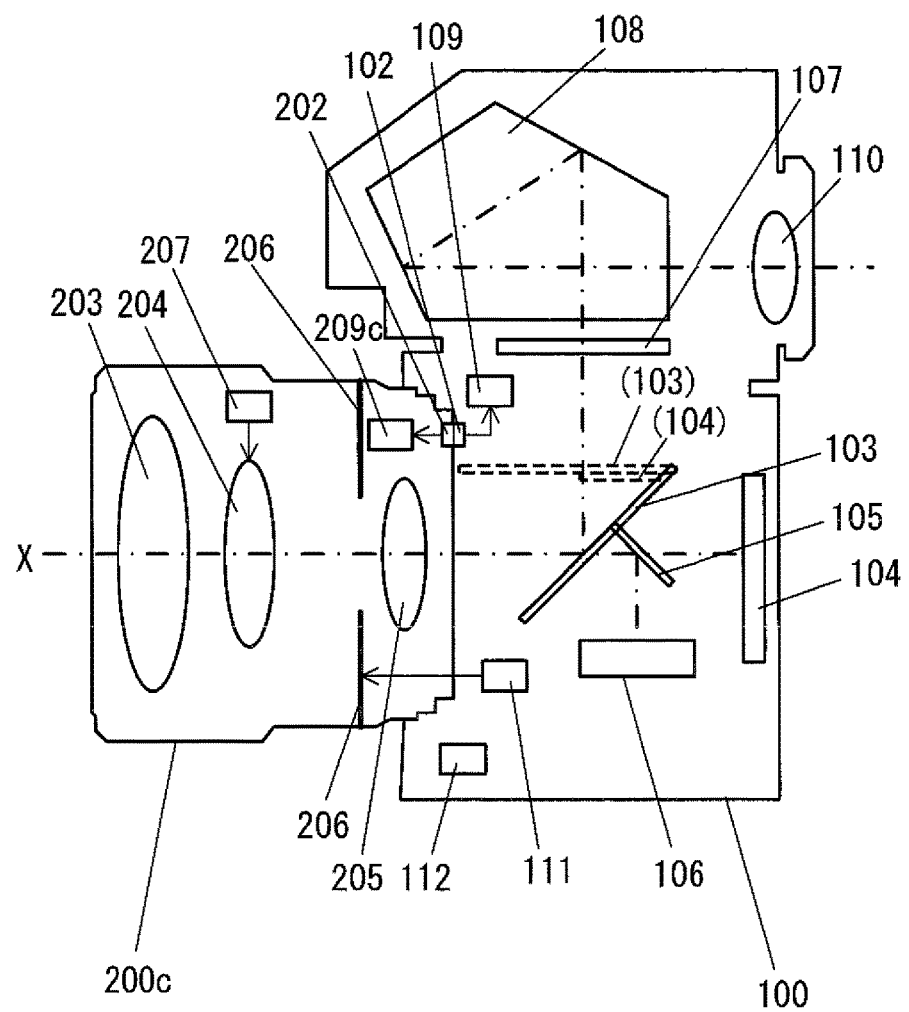
FIG. 4 shows a schematic sectional view of the camera body 100 and a third interchangeable lens 200c.

FIG. 4 is a schematic sectional view of the camera body 100 and the third interchangeable lens 200c. Differences between the third interchangeable lens 200c and the first interchangeable lens 200a will be explained below.

The third interchangeable lens 200c includes a third lens control device 209c instead of the first lens control device 209a.

The body control device 109 firstly performs initial communication with the third lens control device 209c via the aforementioned electric contacts 102 and 202 and identifies, based on the communication results, that the third interchangeable lens 200c is mounted on the body mount unit 101.

The third interchangeable lens 200c does not include the aperture drive unit 208 and the third lens control device 209c thereby does not support any operation corresponding to the aperture drive command. Specifically speaking, the third interchangeable lens 200c cannot drive the aperture 206 by itself. Instead, an aperture operating lever (not shown in the drawing) which is connected to the aperture 206 is provided near the lens mount unit 201 for the third interchangeable lens 200c. This aperture operating lever is a lever capable of moving in a specified direction. The position of the aperture operating lever corresponds to the size of the opening diameter of the aperture 206. When the aperture operating lever is moved, the opening diameter of the aperture 206 changes accordingly. Specifically speaking, when the opening diameter of the aperture 206 is to be set to a certain size, it is only necessary to move the aperture operating lever to a position corresponding to that opening diameter.

When the third interchangeable lens 200c is mounted on the camera body 100, the aperture operating lever engages with a drive member (not shown in the drawing) included in the body side aperture drive unit 111. The body side aperture drive unit 111 is equipped with an actuator (not shown in the drawing) that drives this drive member. When the body side aperture drive unit 111 drives the drive member, the aperture operating lever engaged with the drive member moves and the opening diameter of the aperture 206 changes. Specifically speaking, the body side aperture drive unit 111 drives the aperture 206 included in the third interchangeable lens 200c. When the third interchangeable lens 200c is mounted, the body control device 109 controls the body side aperture drive unit 111 to drive the aforementioned drive member instead of sending the aperture drive command to the third lens control device 209c, thereby changing the opening diameter of the aperture 206 to a desired size.

Furthermore, the third lens control device 209c does not support estimation (or calculation) of the drive time of the aperture 206. Moreover, the third interchangeable lens 200c does not include the lens-side ROM 210 which stores the aforementioned lens data.

(Description of Initialization Processing by Digital Camera System Made Up of Camera Body 100 and Interchangeable Lens 200)

Next, initialization processing executed by the body control device 109 and the control device 209 of each lens (particularly the first lens control device 209a) will be explained. The body control device 109 executes the initialization processing at specified timing, for example, when the interchangeable lens is mounted on the camera body 100 in a power-on state or when the interchangeable lens is mounted on the camera body 100 in a power-off state and then the camera body 100 enters the power-on state. The body control device 109 sets any one of the first to fourth control modes to the camera body 100 during the initialization processing explained below. The details of each control mode will be explained later. Incidentally, the first lens control device 209a, the second lens control device 209b, and the third lens control device 209c will be collectively referred to as the "lens control device" in the following explanation.

Figure 5:
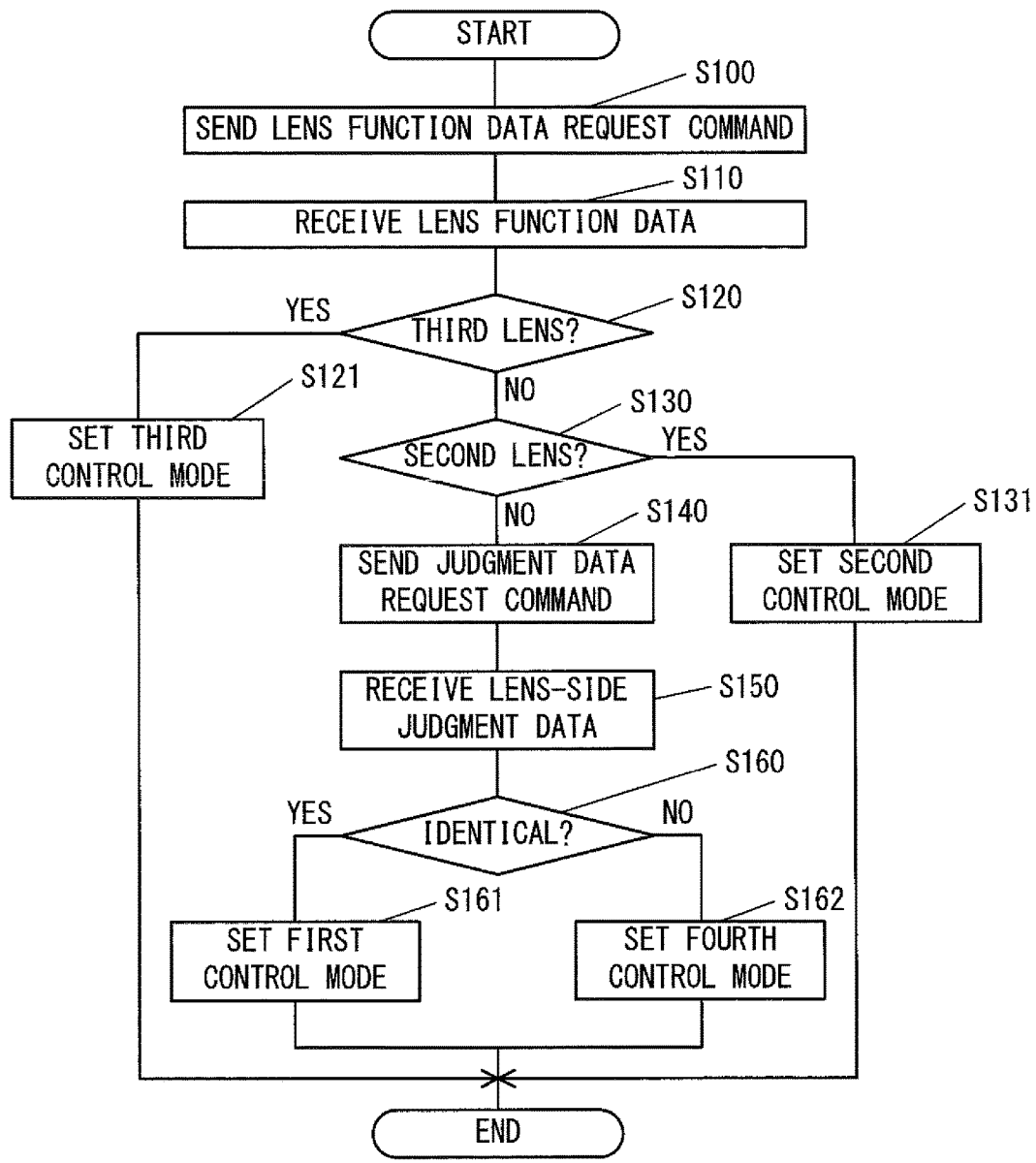
FIG. 5 shows a flowchart illustrating initialization processing executed by a body control device 109.

FIG. 5 is a flowchart illustrating the initialization processing executed by the body control device 109. Firstly, communications are established between the body control device 109 and the lens control device 209; and then in first Step S100, the body control device 109 sends a "lens function data request command" to the lens control device. In Step S110, the body control device 109 receives "lens function data" which is sent from the lens control device as a response to the above-mentioned command. The lens function data is data used to identify functions of the interchangeable lens and contains information about, for example, whether the aperture drive unit 208 exists or not, whether the drive speed of the aperture 206 can be designated or not, the highest possible drive speed of the aperture 206 (the aforementioned highest speed of the aperture), and whether a zooming mechanism exists or not.

In Step S120, whether the interchangeable lens mounted on the body mount unit 101 is the third interchangeable lens 200c or not is judged based on the content of the lens function data received in Step S110. For example, if it is recognized based on the lens function data that the aperture drive unit 208 does not exist, it is determined that the third interchangeable lens 200c is mounted. If it is determined that the third interchangeable lens 200c is mounted, the processing proceeds to Step S121 and the control mode of the camera body 100 is set to the third control mode. If the third control mode is set, the body control device 109 controls driving of the aperture 206 by using the body side aperture drive unit 111 and does not send the aperture drive command to the lens control device.

On the other hand, if it is determined in Step S120 that an interchangeable lens other than the third interchangeable lens 200c is mounted, the processing proceeds to Step S130. In Step S130, whether the interchangeable lens mounted on the body mount unit 101 is the second interchangeable lens 200b or not is judged based on the content of the lens function data received in Step S110. For example, if it is recognized based on the lens function data that the drive speed of the aperture 206 cannot be designated, it is determined that the second interchangeable lens 200b is mounted. If it is determined that the second interchangeable lens 200b is mounted, the processing proceeds to Step S131 and the control mode of the camera body 100 is set to the second control mode. If the second control mode is set, the body control device 109 controls driving of the aperture 206 by sending the aperture drive command to the lens control device, but the sent aperture drive command does not include the drive speed of the aperture 206.

On the other hand, if it is determined in Step S130 that an interchangeable lens other than the second interchangeable lens 200b is mounted, the processing proceeds to Step S140. Incidentally, in this embodiment, the processing proceeds to Step S140 when an interchangeable lens which is neither the third interchangeable lens 200c nor the second interchangeable lens 200b is mounted, that is, when the first interchangeable lens 200a is mounted.

In Step S140, the body control device 109 sends a "judgment data request command" to the first lens control device 209a. In Step S150, the body control device 109 receives "lens-side judgment data" sent from the first lens control device 209a as a response to the above-mentioned command. The lens-side judgment data used for judgment on the camera body in this embodiment is the lens data itself stored in the lens-side ROM 210. The lens data contains, as described earlier, the operation expression (1) "T=a/v+α" to calculate the estimated drive time T from the aperture driving amount (the number of steps to be driven) a and the aperture drive speed v, and the correction term α of the aperture drive time used for the above operation expression. Therefore, the lens control device 209a sends the operation expression (1) "T=a/v+α" and the correction term α, which are generated based on the lens data, as the lens-side judgment data to the camera body. Incidentally, the lens-side ROM 210 stores the correction term α as numerical value data and stores the operation expression (1) as character-string data and the lens control device 209a sends the numerical value data and the character-string data to the camera body.

In Step S160, the body control device 109 compares the body-side judgment data stored in the body-side ROM 112 with the lens-side judgment data received in Step S150 and judges whether the contents of these two pieces of data are identical or not. The content of the body-side judgment data in this embodiment is the lens-side judgment data itself which is stored in the body-side ROM 112 in advance (that is, the aforementioned operation expression (1) and the correction term α). Specifically speaking, in this embodiment, each of the body-side ROM 112 and the lens-side ROM 210 stores the judgment data of the same content (the operation expression (1) "T=a/v+α" and the correction term α) in advance; and in Step S160, the body control device 109 judges whether the contents of these two pieces of lens data are identical or not.

If the content of the body-side judgment data and the content of the lens-side judgment data are judged to be identical in Step S160, the processing proceeds to Step S161 and the body control device 109 sets the control mode of the camera body 100 to the first control mode. If the first control mode is set, the body control device 109 controls driving of the aperture 206 by sending the aperture drive command including the drive speed of the aperture 206 to the lens control device. Furthermore, if the first control mode is set, the body control device 109 acquires the estimated drive time by sending an aperture drive time estimate command to the lens control device 209 before driving the aperture 206, and then controls driving of the aperture 206 by using this estimated drive time.

On the other hand, if the content of the body-side judgment data and the content of the lens-side judgment data are judged to be not identical in Step S160, the processing proceeds to Step S162. In this case, the body control device 109 judges that the lens data stored in the ROM 210 in the first interchangeable lens 200a is damaged due to strong electric impacts such as static electricity; and the body control device 109 then sets the fourth control mode, by which driving of the aperture 206 is restricted, to the camera body 100. In the fourth control mode, the body control device 109 does not send the aperture drive command to the first lens control device 209a and performs, for example, photographing operation while keeping an opening diameter of the aperture 206 fixed. Furthermore, the body control device 109 displays a message (so-called warning display) indicating that there is inconsistency in the stored content of the ROM 210 (for example, there is a failure on the lens side), on a display device (not shown in the drawing) (such as a liquid crystal display) so as to notify the user that control of the aperture 206 is limited.

Incidentally, this embodiment has described the content of the aforementioned "fourth control mode" as displaying the above-mentioned message and limiting control of the aperture 206. However, the content set in the fourth control mode is not limited to that described above. For example, the content of the fourth control mode may be limited to only the aforementioned alarm display. Alternatively, any stronger limitation may be applied by, for example, limiting power supply from the camera body to an accessory (for example, by prohibiting the supply of power which should be supplied to the aperture drive system). Furthermore, any stronger limitation may be applied by, for example, prohibiting the photographing operation on the camera body side.

Furthermore, the alarm display method is not limited to the display of the aforementioned message and any display form may be used as long as a warning about the occurrence of a failure on the lens can be reported to the user. For example, a flashing or lighting alarm display using, for example, LEDs may be employed. Alternatively, a simple message display (such as "Aperture NG") indicating that the aperture control is limited, or an icon display indicating the aperture NG may be brought up on, for example, a liquid crystal display.

Figure 6:
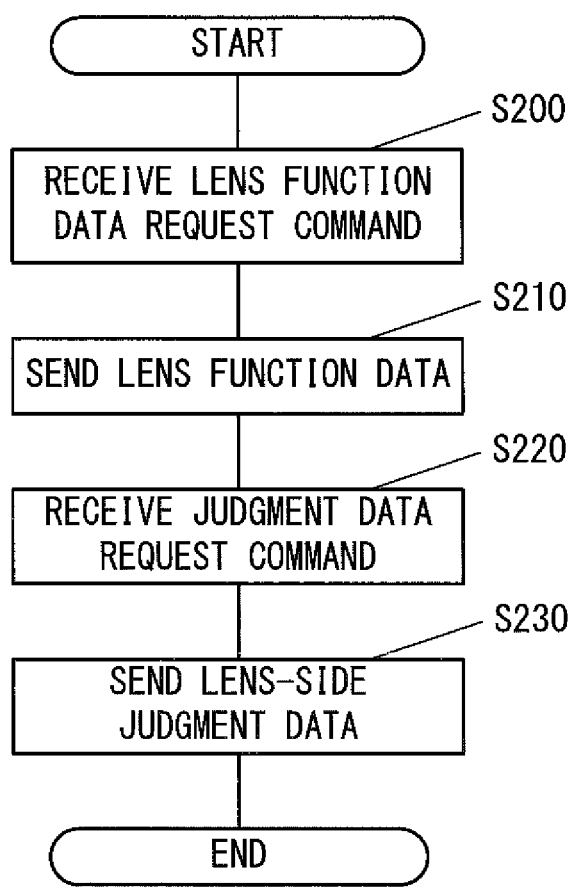

FIG. 6 is a flowchart illustrating lens initialization processing executed by the first lens control device 209a. Firstly in Step S200, the first lens control device 209a receives the "lens function data request command" from the body control device 109 (corresponding to Step S100 in FIG. 5). In Step S210, the first lens control device 209a sends the "lens function data" to the body control device 109 (corresponding to Step S110 in FIG. 5). In Step S220, the first lens control device 209a receives the "judgment data request command" from the body control device 109 (corresponding to Step S140 in FIG. 5). In Step S230, the first lens control device 209a reads the lens data from the ROM 210 and sends the read lens data as the "lens-side judgment data" to the body control device 109 (corresponding to Step S150 in FIG. 5).

(Description of Photographing Operation)

Figure 7:
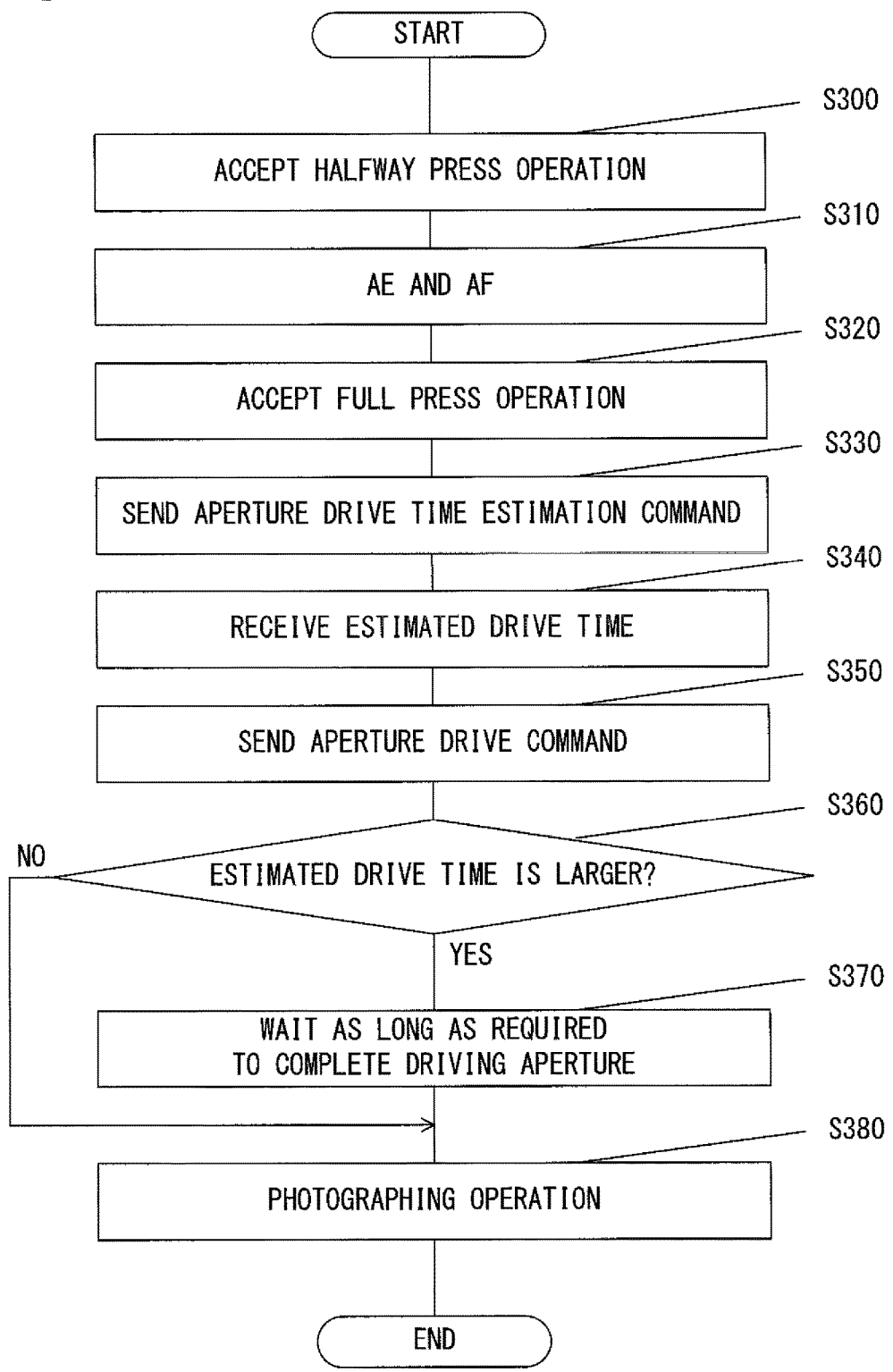
FIG. 7 shows a flowchart illustrating photographing operation executed by the body control device 109 in a first control mode.

FIG. 7 is a flowchart illustrating the photographing operation executed by the body control device 109 in the first control mode. Firstly in Step S300, the body control device 109 accepts halfway press operation of the release switch 120 by the user. In Step S310, the body control device 109 executes well-known automatic exposure (AE) control and automatic focus adjustment (AF) control. The body control device 109 calculates the opening diameter of the aperture 206 (or an aperture value), exposure time of the image sensor 104 and the like at the time of exposure by performing this AE control. Subsequently in Step S320, the body control device 109 accepts full press operation of the release switch 120 by the user. The body control device 109 starts exposure control in response to this full press operation.

In Step S330, the body control device 109 sends the aperture drive time estimation command to the first lens control device 209a. This command includes a parameter corresponding to the opening diameter (or the aperture value) calculated in Step S310. Specifically speaking, the aperture drive time estimation command which is sent here is a command to have the first lens control device 209a estimate time required to drive the aperture 206 from the current opening diameter to the opening diameter calculated in Step S310.

In Step S340, the body control device 109 receives the estimated drive time of the aperture 206 from the first lens control device 209a. In Step S350, the body control device 109 sends the aperture drive command to the first lens control device 209a to drive the aperture 206 to the opening diameter (or the aperture value) calculated in Step S310. This command includes a parameter corresponding to the opening diameter (or the aperture value) calculated in Step S310.

In Step S360, the body control device 109 judges whether the estimated drive time of the aperture 206 as received in Step S340 is more than a predetermined threshold value or not. In this embodiment, this threshold value is defined as a value of a release time lag in the camera body 100 (for example, time required to drive the quick return mirror 103 to its retracted position). Specifically speaking, in Step S360, whether the time required for photographing preparation of the aperture 206 is more than the time required for photographing preparation on the camera body 100 side or not is judged.

If it is judged in Step S360 that the estimated drive time is more than the predetermined threshold value, the processing proceeds to Step S370. In Step S370, the body control device 109 waits as long as necessary for the completion of driving of the aperture 206; and then the processing proceeds to Step S380. The waiting time here is time obtained by subtracting the release time lag on the camera body 100 side from the estimated drive time of the aperture 206. On the other hand, if the estimated drive time is equal to or less than the predetermined threshold value in Step S360, driving of the aperture 206 must have been completed when the photographing preparation on the camera body 100 side is completed, so that the processing proceeds to Step S380 without providing the waiting time as in Step S370. In Step S380, the photographing operation is executed. Specifically speaking, the image sensor 104 is exposed to light and the body control device 109 creates photographed image data based on light reception output of the image sensor 104.

Figure 8:
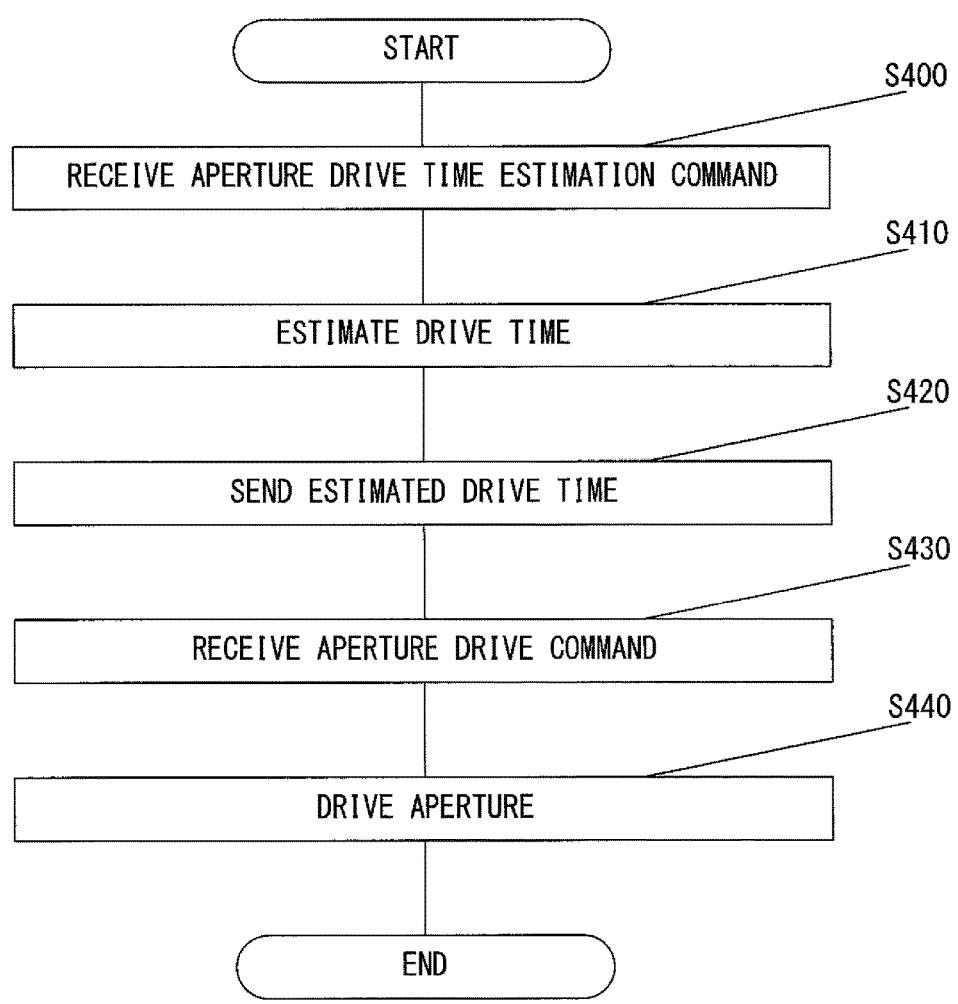
FIG. 8 shows a flowchart illustrating photographing operation executed by the first lens control device 209a in the first control mode.

FIG. 8 is a flowchart illustrating photographing operation executed by the first lens control device 209a in the first control mode. Firstly in Step S400, the first lens control device 209a receives the aperture drive time estimation command from the body control device 109 (corresponding to Step S330 in FIG. 7). Then in Step S410, the first lens control device 209a estimates the drive time of the aperture 206 (or calculates the estimated drive time) based on the parameters included in the received aperture drive time estimation command (the aperture driving amount a and the aperture drive speed v) and the lens data stored in the lens-side ROM 210 (the aforementioned operation expression (1) and the correction term α). In Step S420, the first lens control device 209a sends the estimated drive time calculated in Step S410 to the body control device 109 (corresponding to Step S340 in FIG. 7).

In Step S430, the first lens control device 209a receives the aperture drive command from the body control device 109 (corresponding to Step S350 in FIG. 7). Then in Step S440, the first lens control device 209a controls the aperture drive unit 208 based on the parameters included in the received aperture drive command so as to drive the aperture 206 by the designated driving amount in the designated drive direction and at the designated drive speed.

The camera system according to the aforementioned first embodiment can achieve the following operations and effects. (1) The first interchangeable lens 200a includes: the optical system including the aperture 206 which is the driven member; the aperture drive unit 208 that drives the aperture 206; and the lens-side ROM 210 that stores the lens data about driving of the aperture 206 by the aperture drive unit 208. The first lens control device 209a sends to the camera body 100 the lens-side judgment data, which is configured based on the lens data stored in the lens-side ROM 210 and based on which whether the lens data is properly stored in the lens-side ROM 210 or not can be judged. As a result, whether the lens data is true or false can be judged on the camera body side by using the lens data which is used for actual photographing operation (or aperture control operation). If it is determined as "true" for this judgment, the data retained in the lens-side ROM 210 can be used by considering that such data is highly safe, that is, the lens data stored in the lens-side ROM 210 is properly stored. Accordingly, it can be considered that the estimated drive time of the aperture 206 will be calculated properly during the subsequent photographing operation.

(2) The body control device 109 receives the lens-side judgment data, which is configured based on the lens data stored in the lens-side ROM 210 and based on which whether the lens data is properly stored in the lens-side ROM 210 or not can be judged on the camera body 100, from the first interchangeable lens 200a, and judges whether the lens data is properly stored in the lens-side ROM 210 or not, based on the lens-side judgment data. As a result, whether the lens data about the aperture drive control is true or false can be judged before the actual photographing operation (or aperture control operation), so that it is possible to prevent failed photographing based on erroneous lens-side data.

(3) The first lens control device 209a estimates the drive time required for the aperture drive unit 208 to drive the aperture 206 by a specified amount at a specified speed based on the lens data stored in the ROM 210. As a result, it is possible for the camera body 100 to facilitate timewise collaboration between aperture driving on the interchangeable lens 200 side and shutter driving on the camera body side, thereby shortening the release time lag.

(4) The first lens control device 209a sends the lens data stored in the lens-side ROM 210 as the lens-side judgment data to the camera body 100. Also, the body control device 109 receives the lens data stored in the lens-side ROM 210 as the lens-side judgment data from the first interchangeable lens 200a. As a result, whether the lens-side data (or the lens data) which is to be used for the actual photographing operation (or the aperture control operation) is true or false is judged by using the lens-side data (or the lens data) itself. If it is determined as a result of this judgment that the lens-side data (or the lens data) is "true," it can be considered that the lens data is properly stored and that the estimated drive time of the aperture 206 will be calculated properly during the subsequent photographing operation.

Second Embodiment

The configuration of a camera system according to a second embodiment of the present invention is the same as that of the first embodiment, except for some part of it. The difference between the second embodiment and the first embodiment will be explained below. Incidentally, in the following explanation, the same reference numerals as those in the first embodiment are assigned to the same elements as those in the first embodiment and an explanation about them has been omitted.

The camera system according to the second embodiment is equipped with a means capable of calculating (or generating) simplified estimated drive time T' relating to the estimated drive time T of the aforementioned aperture 206 by a "simpler method" (for example, by simplified calculation) than the aforementioned first embodiment separately from the means of estimating the estimated drive time T; and the estimated drive time (or a simplified calculated value) of the aperture as calculated by the simple method is defined as the lens-side judgment data.

Now, the above-mentioned "simple method" will be explained. In the first embodiment, the lens-side ROM 210 stores, as the lens data, the operation expression (1) "$T=a/v+\alpha$" (the aperture driving amount a, the aperture drive speed v, the estimated drive time T, and the correction term $\alpha$) and the correction term $\alpha$, and the estimated drive time T is calculated by using this operation expression (1). On the other hand, the lens-side ROM 210 according to this second embodiment stores, besides the combination of the above-mentioned operation expression (1) and the correction term $\alpha$, simplified operation expression (2) "$T'=a/v$" obtained by excluding the correction term $\alpha$ from the above operation expression (1). The "simple method" according to the second embodiment is to calculate (or generate) the "simplified estimated drive time T'" by using this simplified operation expression (2). As is apparent from the operation expression (2), the "simplified estimated drive time T'" is time calculated by using only the aperture driving amount a and the aperture drive speed v.

The body control device 109 sends to the first lens control device 209a a "simplified aperture drive time estimation command" that includes desired parameters (a desired aperture driving amount (the number of steps) a and a desired aperture drive speed v) and requests the "simplified estimated drive time T'" from the interchangeable lens 200a, instead of the aforementioned judgment data request command in the first embodiment.

On the other hand, the body control device 109 stores the simple operation expression "$T'=a/v$" in advance, which has the same content as that of the above-mentioned simple operation expression (2), as the body-side data in the body-side ROM 112. Specifically speaking, the simple operation expression "$T'=a/v$" is an operation expression which is stored commonly in both the body-side ROM 112 and the lens-side ROM 210 (the above-described simple operation expression (2) will be hereinafter sometimes referred to as the "common operation expression").

After sending the "simplified aperture drive time estimation command" to the first lens control device 209a, the body control device 109 independently estimates the aperture drive time based on the above-described common operation expression (the body-side data) stored in the body-side ROM 112 and the above-described desired parameters (the aperture driving amount a and the aperture drive speed v) sent to the interchangeable lens 200a.

Specifically speaking, the body control device 109 applies the above-mentioned desired parameters (the aperture driving amount a and the aperture drive speed v) to the common operation expression included in the body-side data and calculates the simplified estimated drive time T'. Then, the body control device 109 compares the simplified estimated drive time T' received from the first lens control device 209a with the simplified estimated drive time T' calculated by itself. If these values are identical, the body control device 109 judges that the lens data (not only the operation expression (2), but also the operation expression (1) and the correction term $\alpha$) is properly stored in the lens-side ROM 210.

Figure 9:
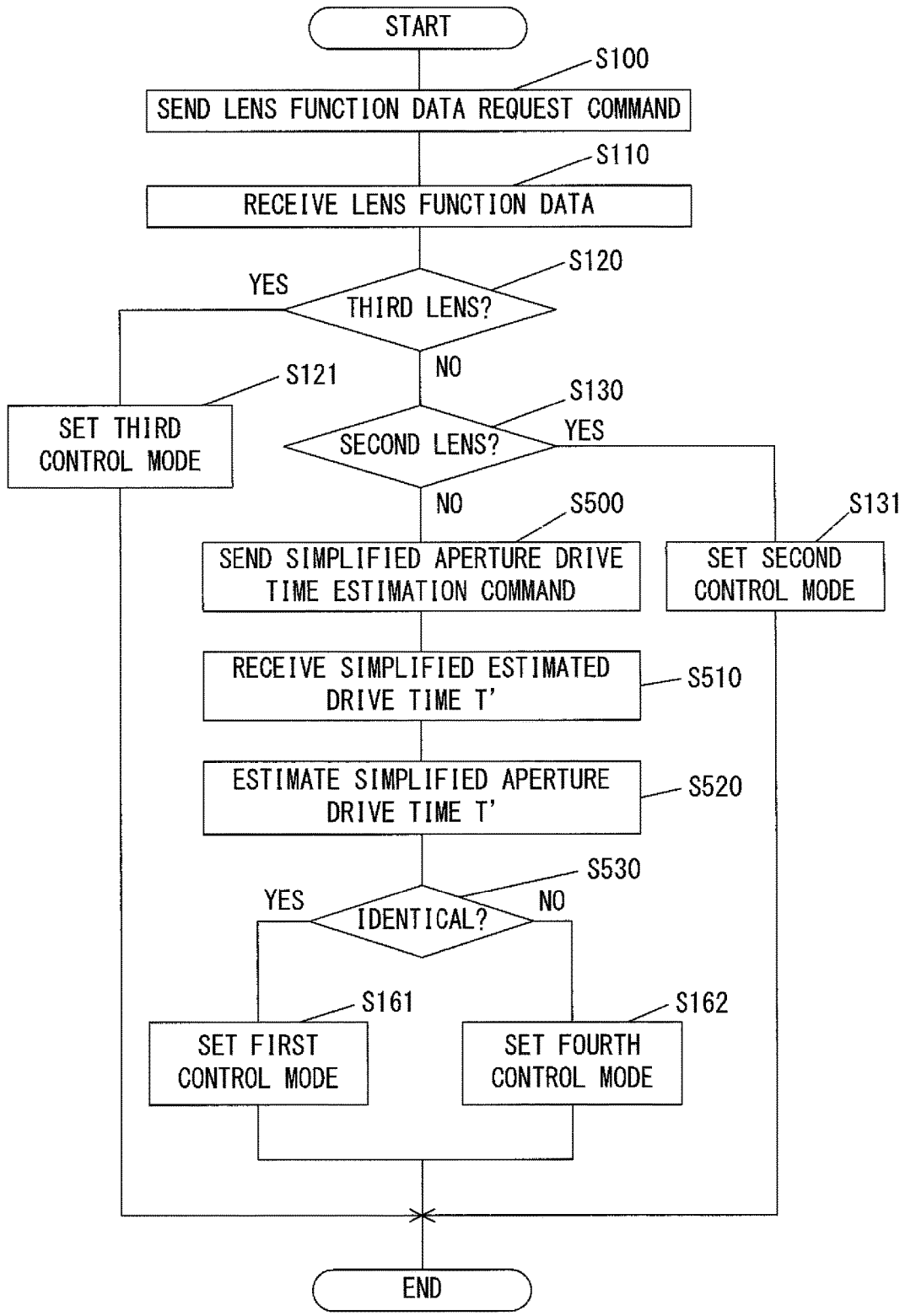
FIG. 9 shows a flowchart illustrating initialization processing executed by the body control device 109 according to a second embodiment.

FIG. 9 is a flowchart illustrating initialization processing executed by the body control device 109 according to the second embodiment. Incidentally, the processing from Step S100 to S130 is the same as that of the lens initialization processing (FIG. 5) according to the first embodiment, so its explanation has been omitted.

If the body control device 109 determines in Step S130 that the first interchangeable lens 200a is mounted, the processing proceeds to Step S500. In Step S500, the body control device 109 sends a simplified aperture drive time estimation command including desired parameters (the aperture driving amount a and the aperture drive speed v) to the first lens control device 209a. The parameters which are set here may be fixed values (specified parameters, that is, a combination of a specified aperture driving amount a and a specified aperture drive speed v) or different random values which vary every time the initialization processing is executed (which may be a combination of both random values of the aperture driving amount a and the aperture drive speed v or a combination of these values, only either one of which is a random value). In subsequent Step S510, the body control device 109 receives the simplified estimated drive time T' from the first lens control device 209a.

In Step S520, the body control device 109 estimates the drive time of the aperture 206 in a simple manner based on the body-side data (the common operation expression) stored in the body-side ROM 112 and the parameters for the aperture drive time estimation command (the aperture driving amount a and the aperture drive speed v) sent in Step S500. Then, in Step S530, the body control device 109 judges whether the simplified estimated drive time T' received in Step S510 and the simplified estimated drive time T' calculated in Step S520 are identical or not. If these two values are identical, the processing proceeds to Step S161 and the body control device 109 sets the control mode of the camera body 100 to the first control mode.

On the other hand, if the simplified estimated drive time T' calculated on the body side and the simplified estimated drive time T' calculated on the lens side are judged to be not identical in Step S530, the processing proceeds to Step S162. In this case, the body control device 109 judges that the aforementioned lens data (not only the operation expression (2), but also the operation expression (1) and the correction term α) stored in the lens-side ROM 210 in the first interchangeable lens 200a is damaged due to strong electric impacts such as static electricity; and the body control device 109 sets the fourth control mode, by which driving of the aperture 206 is restricted, to the camera body 100.

Figure 10:
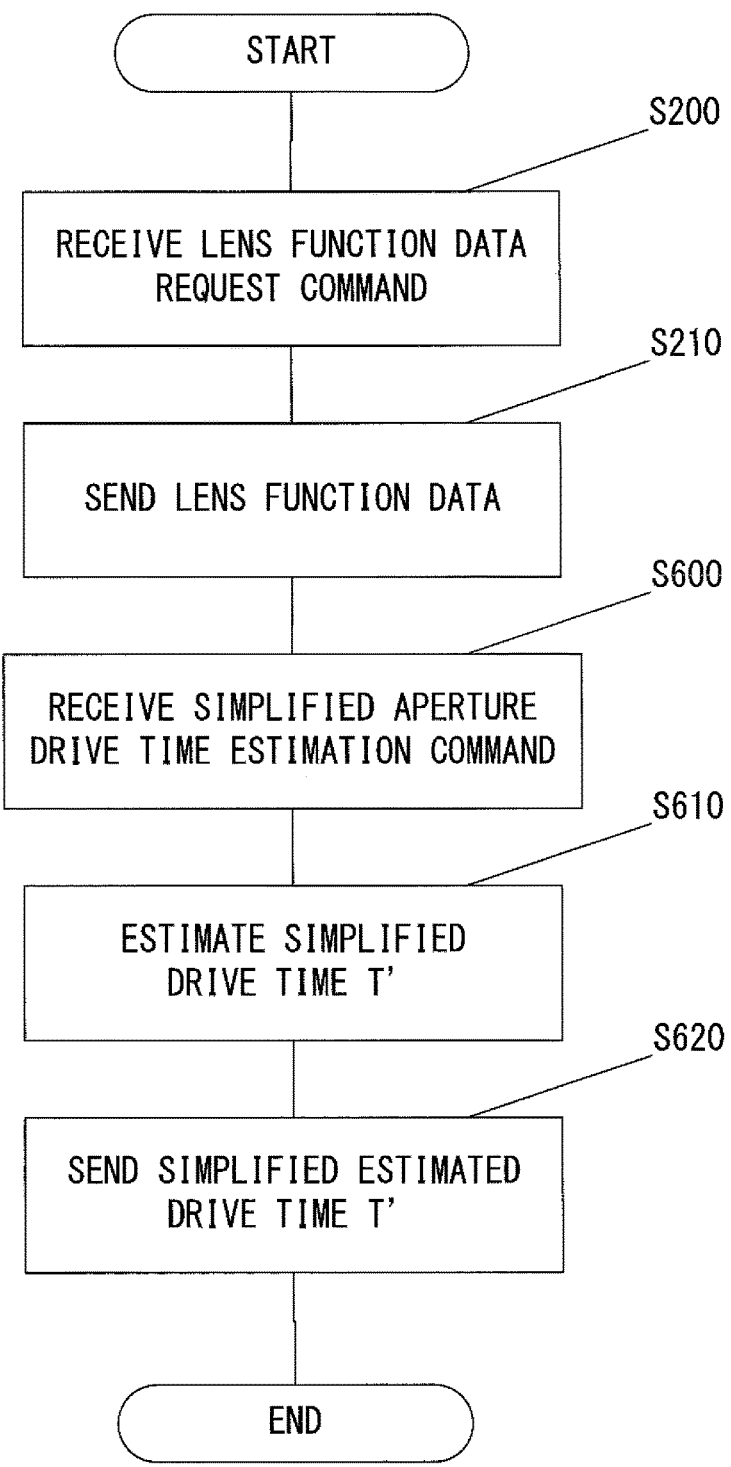
FIG. 10 shows a flowchart illustrating initialization processing executed by the first lens control device 209a according to the second embodiment.

FIG. 10 is a flowchart illustrating initialization processing executed by the first lens control device 209a according to the second embodiment. Incidentally, the processing in Steps S200 and S210 is the same as that of the lens initialization processing (FIG. 6) according to the first embodiment, so its explanation has been omitted.

In Step S600, the first lens control device 209a receives the "simplified aperture drive time estimation command" from the body control device 109 (corresponding to Step S500 in FIG. 9). In Step S610 in the same manner as in Step S410 in FIG. 8, the first lens control device 209a estimates the drive time of the aperture in a simplified manner (or calculates the simplified estimated drive time T') based on the parameters included in the received simplified aperture drive time estimation command (the aperture driving amount a and the aperture drive speed v) and the lens data (or the common operation expression) stored in the lens-side ROM 210. In Step S620, the first lens control device 209a sends the simplified estimated drive time T' calculated in Step S610 to the body control device 109 (corresponding to Step S510 in FIG. 9).

The camera system according to the aforementioned second embodiment can achieve the following operations and effects. (1) The first lens control device 209a sends the simplified estimated drive time T' of the aperture 206 as the lens-side judgment data to the camera body 100. Furthermore, the body control device 109 receives the result T' of the simplified calculation of the drive time required to drive the aperture 206 by an arbitrary amount (the number of steps) at an arbitrary speed, which was calculated by the first lens control device 209a based on the lens data (or the common operation expression), as the lens-side judgment data from the first interchangeable lens 200a. The lens data (or the common operation expression) same as part of the lens data (or the common operation expression) stored in the lens-side ROM 210 in the first interchangeable lens 200a is stored in the body-side ROM 112 in the camera body 100. The body control device 109 estimates, in a simplified manner, the drive time required to drive the aperture 206 by the arbitrary amount (the number of steps) at the arbitrary speed based on the lens data (or the common operation expression) stored in the body-side ROM 112; and then compares the simplified estimated drive time T' with the lens-side judgment data (the simplified estimated drive time T' calculated on the lens side) received from the first interchangeable lens 200a. In this manner, the lens-side judgment data stored in the lens-side ROM 210 can be handled as highly safe data (the lens-side judgment data stored in the lens-side ROM 210 can be considered as being properly stored). Consequently, the lens-side ROM itself can be handled as being highly safe. Specifically speaking, all pieces of the lens data in the lens-side ROM 210 (all three of the common operation expression, the operation expression (1), and the correction term α) can be considered as being highly safe (by considering that they are properly stored). As a result, the safety or stability of the lens data can be confirmed with only the calculation result of the simplified estimated drive time T' and, therefore, it is possible to reduce the size of the lens-side judgment data and reduce communication loads. It is also possible to judge not only whether the lens data is properly stored or not, but also whether or not the simplified estimated drive time T' can be properly calculated by using the lens data (the operation expression (2) which is part of the operation expression (1)), that is, to perform partial judgment of the operation expression (1).

Third Embodiment

The configuration of a camera system according to a third embodiment of the present invention is the same as that of the first embodiment, except for some part of it. The difference between the third embodiment and the first embodiment will be explained below. Incidentally, in the following explanation, the same reference numerals as those in the first embodiment are assigned to the same elements as those in the first embodiment and an explanation about them has been omitted.

With the camera system according to the third embodiment, the body-side data as explained in each of the aforementioned embodiments is not stored in the body-side ROM 112 of the camera body 100. The body control device 109 sends two aperture drive time estimation commands whose parameters are different (at least either one of the values of the aperture driving amount a and the aperture drive speed v is different) to the first lens control device 209a. Then, the body control device 109 judges whether the lens data is properly stored in the lens-side ROM 210 by judging whether the size relation between two estimated drive times obtained by the respective commands is as expected or not.

For example, let us assume that the first aperture drive time estimation command (hereinafter sometimes referred to as the "aperture drive time estimation command A") is a command to estimate the drive time when driving the aperture 206 by a 2-step amount (the aperture driving amount a=2 steps) in a specified direction at specified aperture drive speed; and the second aperture drive time estimation command (hereinafter sometimes referred to as the "aperture drive time estimation command B") is a command to estimate the drive time when driving the aperture 206 by a 4-step amount (the aperture driving amount a=4 steps) in the same direction and at the same aperture drive speed as those of the first aperture drive time estimation command. In this case, the estimated drive time (time calculated by using v=the specified speed, a=2 steps, the aforementioned operation expression (1), and the correction term α) sent from the first lens control device 209a as a response to the first aperture drive time estimation command should be smaller than the estimated drive time (time calculated by using v=the specified speed, a=4 steps, the aforementioned operation expression (1), and the correction term α) sent as a response to the second aperture drive time estimation command because the aperture driving amount (2 steps) for the aperture drive time estimation command A is less than the aperture driving amount (4 steps) for the aperture drive time estimation command B. As a matter of course, the body control device 109 expects, among the estimated drive times sent from the first lens control device 209a, that the estimated drive time in response to the aperture drive time estimation command A is smaller (or shorter) then the estimated drive time in response to the aperture drive time estimation command B. So, the body control device 109 judges whether the first estimated drive time is smaller than the second estimated drive time or not, thereby examining whether the first lens control device 209a has estimated the drive time of the aperture 206 successfully and properly, that is, whether the lens data is properly stored in the lens-side ROM 210 or not. In this third embodiment, when the first estimated drive time is smaller than the second estimated drive time, it is determined that the first lens control device 209a has estimated the drive time of the aperture 206 successfully and properly.

Figure 11:
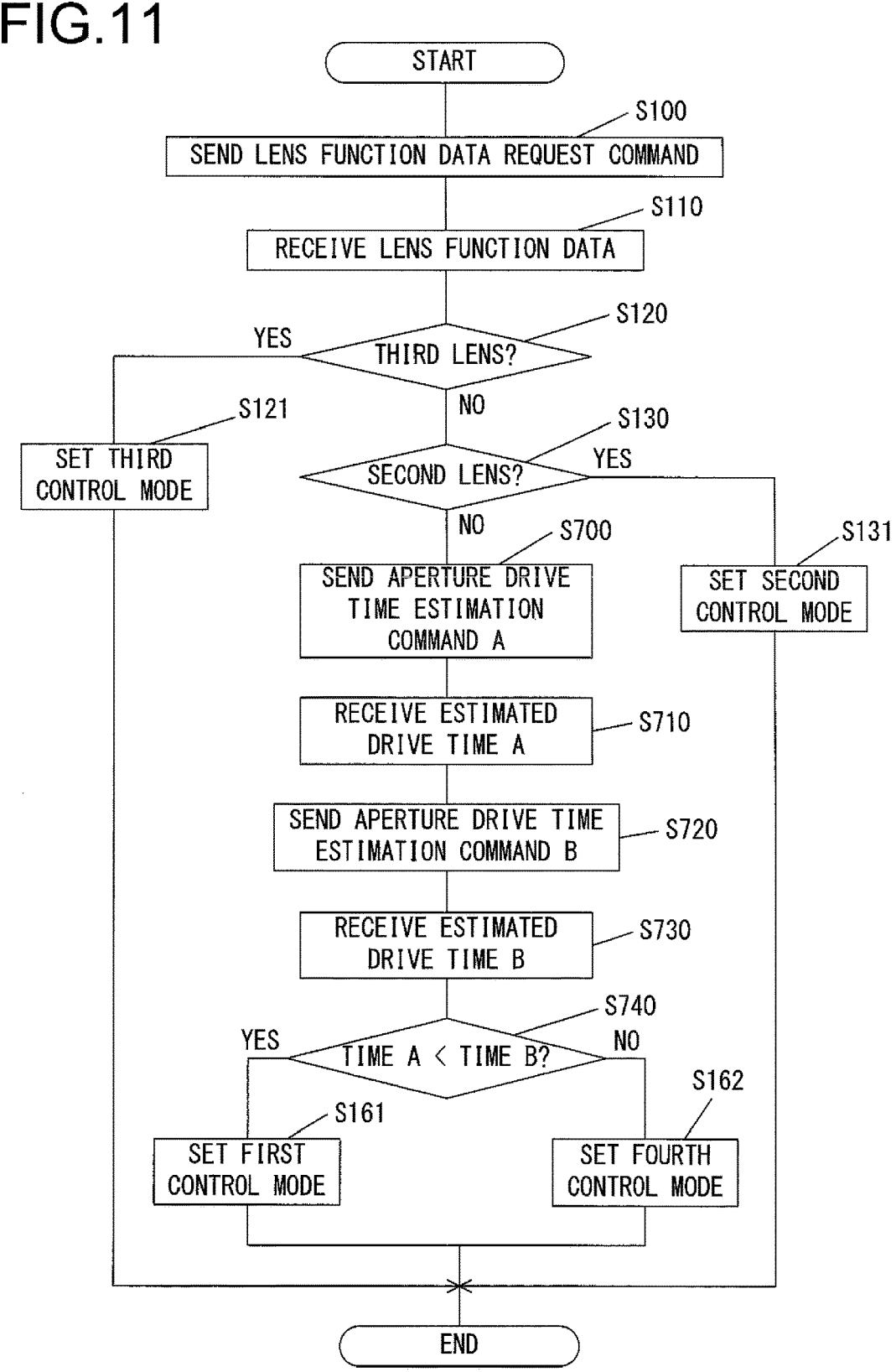
FIG. 11 shows a flowchart illustrating initialization processing executed by the body control device 109 according to a third embodiment.

FIG. 11 is a flowchart illustrating lens initialization processing executed by the body control device 109 according to the third embodiment. Incidentally, the processing from Step S100 to S130 is the same as that of the lens initialization processing (FIG. 5) according to the first embodiment, so its explanation has been omitted.

If the body control device 109 determines in Step S130 that the first interchangeable lens 200a is mounted, the processing proceeds to Step S700. In Step S700, the body control device 109 sends an aperture drive time estimation command including specified parameters (hereinafter referred to as the aperture drive time estimation command A) to the first lens control device 209a. The parameters which are set here may be fixed values or different random values every time the initialization processing is executed. In subsequent Step S710, the body control device 109 receives the estimated drive time (hereinafter referred to as the estimated drive time A) from the first lens control device 209a.

In Step S720, the body control device 109 sends an aperture drive time estimation command including different parameters from those sent in Step S700 (hereinafter referred to as the aperture drive time estimation command B). It is assumed that the parameters included in the aperture drive time estimation command B are parameters which will ensure larger drive time as the estimated result than that resulted from the parameters included in the aperture drive time estimation command A. For example, the same drive direction and drive speed may be used and the driving amount of the aperture drive time estimation command B may be larger. Alternatively, the same driving amount and drive direction may be used and a lower drive speed may be employed for the drive time estimation command B. In subsequent Step S730, the body control device 109 receives the estimated drive time (hereinafter referred to as the estimated drive time B) from the first lens control device 209a.

In Step S740, the body control device 109 judges whether the estimated drive time A received in Step S710 is smaller than the estimated drive time B received in Step S730 or not. If the estimated drive time A is smaller than the estimated drive time B, the processing proceeds to Step S161 and the body control device 109 sets the control mode of the camera body 100 to the first control mode.

On the other hand, if the estimated drive time A is equal to or larger than the estimated drive time B in Step S740, the processing proceeds to Step S162. In this case, the body control device 109 considers that the lens data stored in the lens-side ROM 210 in the first interchangeable lens 200a is damaged due to strong electric impacts such as static electricity; and the body control device 109 sets the fourth control mode, by which driving of the aperture 206 is restricted, to the camera body 100.

Figure 12:
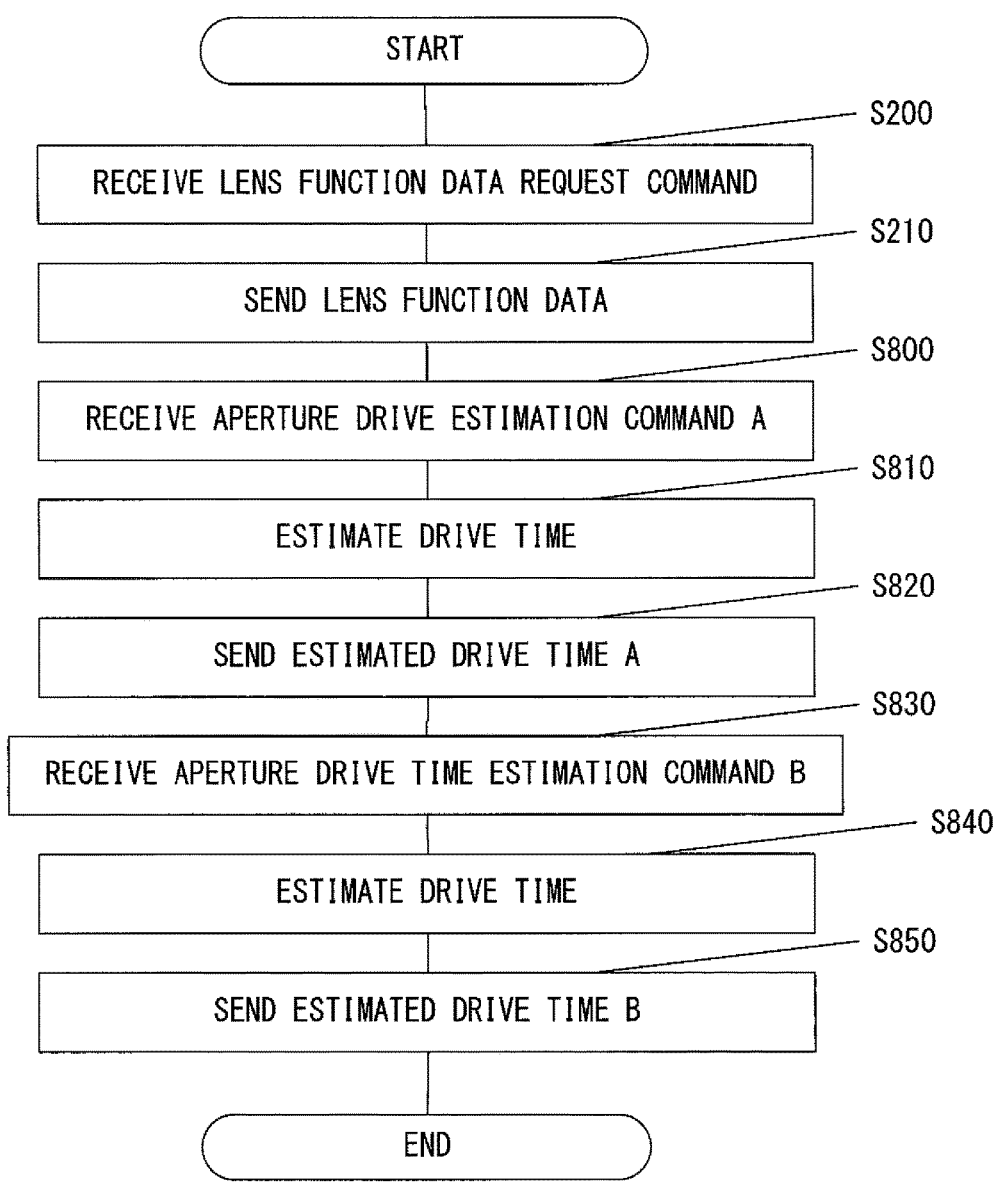
FIG. 12 shows a flowchart illustrating initialization processing executed by the first lens control device 209a according to the third embodiment.

FIG. 12 is a flowchart illustrating lens initialization processing executed by the first lens control device 209a according to the third embodiment. Incidentally, the processing in Steps S200 and S210 is the same as that of the initialization processing (FIG. 6) according to the first embodiment, so its explanation has been omitted.

In Step S800, the first lens control device 209a receives the "aperture drive time estimation command A" from the body control device 109 (corresponding to Step S700 in FIG. 11). In Step S810 in the same manner as in Step S410 in FIG. 8, the first lens control device 209a estimates the drive time of the aperture 206 (or calculates the estimated drive time A) based on the parameters (the aperture driving amount a and the aperture drive speed v) included in the received aperture drive time estimation command A and the lens data (the above-described operation expression (1) and the correction term α) stored in the lens-side ROM 210. In Step S820, the first lens control device 209a sends the estimated drive time A calculated in Step S810 to the body control device 109 (corresponding to Step S710 in FIG. 11).

Incidentally, the system may be configured so that the aforementioned operation expression (2) may be stored as the lens data stored in the lens-side ROM 210 and the drive time of the aperture 206 may be estimated (or the estimated drive time A may be calculated) by using this operation expression (2) in Step S810 described above.

From Step S830 to Step S850 in the same manner as from Step S800 to Step S820, the first lens control device 209a receives the "aperture drive time estimation command B" from the body control device 109 (corresponding to Step S720 in FIG. 11), calculates the estimated drive time B in the same manner as in Step S810 described above, and sends it to the body control device 109 (corresponding to Step S730 in FIG. 11).

The camera system according to the aforementioned third embodiment can achieve the following operations and effects. (1) The body control device 109 sends the two aperture drive time estimation commands including mutually different parameters to the first lens control device 209a, compares the two estimated drive times sent by the first lens control device 209a in response to the above two commands, and thereby judges whether the lens data is properly stored in the ROM 210 or not (that is, the safety of the lens data). As a result, it is possible to judge the safety or stability of the lens data without necessity to store the body-side data, which is used to judge the safety of the lens data, in the body-side ROM 112 in the camera body 100 in advance.

Fourth Embodiment

The configuration of a camera system according to a fourth embodiment of the present invention is the same as that of the first and second embodiments, except for some part of it. The difference between the fourth embodiment and the first and second embodiments will be explained below. Incidentally, in the following explanation, the same reference numerals as those in the first and second embodiments are assigned to the same elements as those in the first and second embodiments and an explanation about them has been omitted.

The camera system according to the fourth embodiment calculates the estimated drive time T of the aforementioned aperture 206 by using the operation expression (1) explained in the aforementioned first embodiment and uses the calculated estimated aperture drive time as the lens-side judgment data.

The body-side ROM 112 according to the fourth embodiment stores the above-described operation expression (1) in advance, but does not store the correction term α data (numerical value data). Regarding the correction term α data, the data size of data of only one interchangeable lens may possibly become large; and if the correction term α data of each of a plurality of interchangeable lenses is to be stored in the body-side ROM 112, it might become necessary to, for example, add a memory (such as a ROM). Therefore, the system according to this fourth embodiment is configured so that the correction term α data is not stored in the body-side ROM 112 in advance and is received from the interchangeable lens (the lens-side ROM 210) every time it is needed (by issuing a correction term α data request command to the interchangeable lens). Incidentally, when the body control device 109 sends the aperture drive time estimation command including the desired parameters (the aperture driving amount a and the aperture drive speed v) to the lens control device 209a, it sends the correction term α data request command.

After receiving the above-described aperture drive time estimation command, the lens control device 209 calculates the estimated drive time T by using the above-described operation expression (1) and the correction term α data which are stored in the lens-side ROM 210. After also receiving the correction term α data request command, the lens control device 209 extracts the correction term α data corresponding to the desired parameters from among the plurality of pieces of correction term α data stored in the lens-side ROM 210. Then, the lens control device sends the calculated estimated drive time T and the extracted correction term α data (the numerical value data) to the body side.

After receiving the correction term α data from the lens-side ROM 210, the body control device 109 independently estimates (or calculates) the aperture drive time based on the received correction term α data, the aforementioned operation expression (1) (the body-side data) stored in the body-side ROM 112, and the above-described desired parameters (the aperture driving amount a and the aperture drive speed v) sent to the interchangeable lens 200a. Then, the body control device 109 compares the estimated drive time T received from the first lens control device 209a with the estimated drive time T calculated by itself; and if these values are identical, the body control device 109 considers that the lens data (the operation expression (1) and the correction term α) is properly stored in the lens-side ROM 210.

Figure 13:
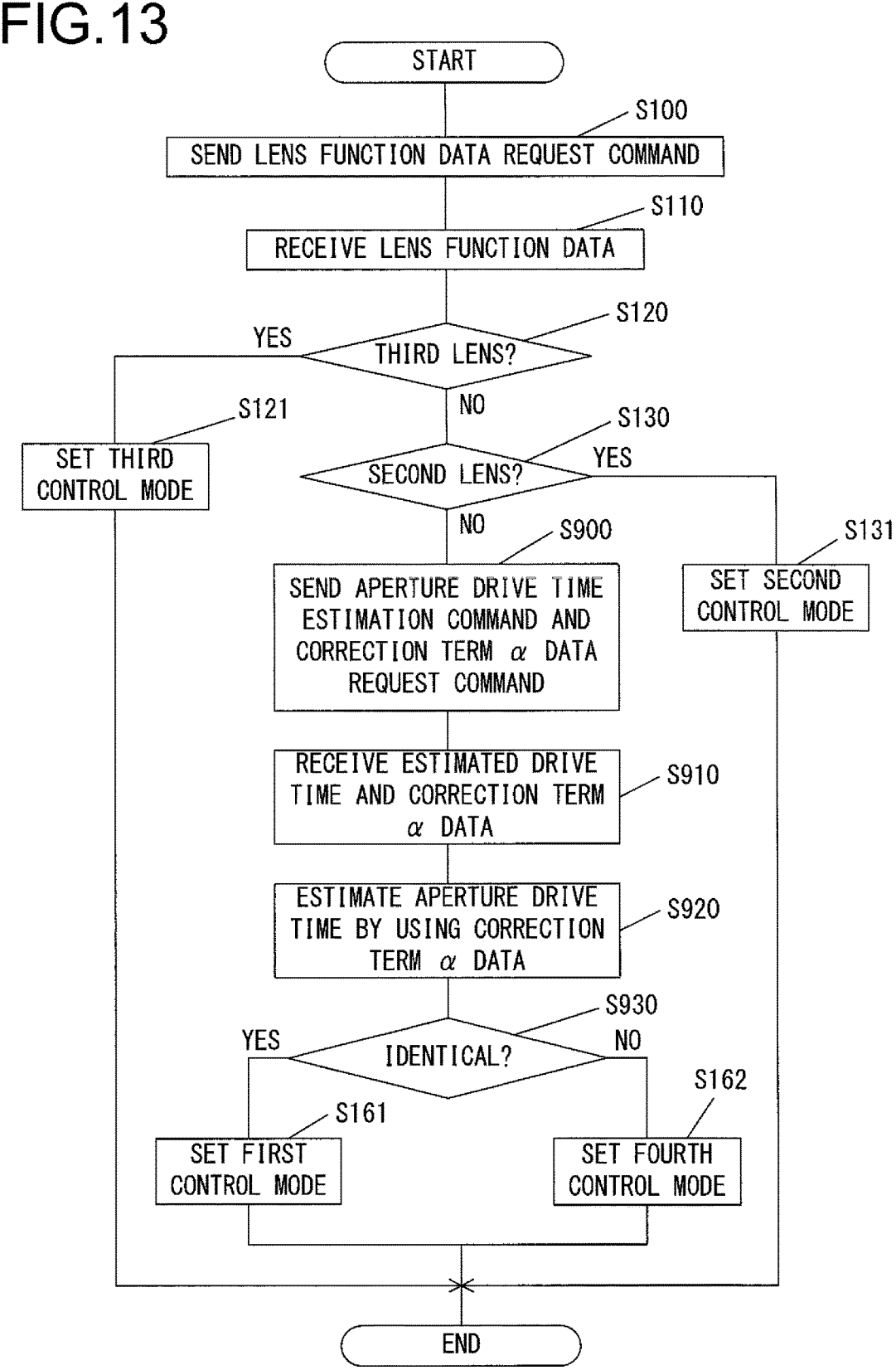
FIG. 13 shows a flowchart illustrating initialization processing executed by the body control device 109 according to a fourth embodiment.

FIG. 13 is a flowchart illustrating initialization processing executed by the body control device 109 according to the fourth embodiment. Incidentally, the processing from Step S100 to S130 is the same as that of the lens initialization processing (FIG. 5) according to the first embodiment, so its explanation has been omitted.

If the body control device 109 determines in Step S130 that the first interchangeable lens 200a is mounted, the processing proceeds to Step S900.

In Step S900, the body control device 109 sends a drive time estimation command including desired parameters (the aperture driving amount a and the aperture drive speed v) to the first lens control device 209a. The parameters which are set here may be fixed values (specified parameters, that is, a combination of a specified aperture driving amount a and a specified aperture drive speed v) or different random values which vary every time the initialization processing is executed (which may be a combination of both random values of the aperture driving amount a and the aperture drive speed v or a combination of these values, only either one of which is a random value).

Also, in this Step S900, the body control device 109 sends a command to request the aforementioned correction term α data from the first lens control device 209a. The body control device 109 requests the lens control device 209, through this request command, to provide the correction term α data corresponding to a combination of the specified aperture driving amount a and the specified aperture drive speed v.

In subsequent Step S910, the body control device 109 receives the estimated drive time T' from the first lens control device 209a. Also in this Step S910, the body control device 109 receives the numerical value data of the correction term α extracted by the lens control device 209a.

In Step S920, the body control device 109 estimates and calculates the drive time of the aperture 206 in a simplified manner based on the body-side data (the operation expression (1)) stored in the body-side ROM 112, the parameters for the aperture drive time estimation command (the aperture driving amount a and the aperture drive speed v) sent in Step S900, and the numerical value data of the correction term α acquired from the lens side in Step S910. Then, in Step S930, the body control device 109 judges whether the estimated drive time T received in Step S910 and the estimated drive time T calculated in Step S920 are identical or not. If these two values are identical, the processing proceeds to Step S161 and the body control device 109 sets the control mode of the camera body 100 to the first control mode.

On the other hand, if the estimated drive time T calculated on the body side and the estimated drive time T calculated on the lens side are not identical in Step S930, the processing proceeds to Step S162. In this case, the body control device 109 considers that the aforementioned lens data (at least one of the operation expression (1) and the correction term α) stored in the lens-side ROM 210 in the first interchangeable lens 200a is damaged due to strong electric impacts such as static electricity; and the body control device 109 sets the fourth control mode, by which driving of the aperture 206 is restricted, to the camera body 100.

Figure 14:
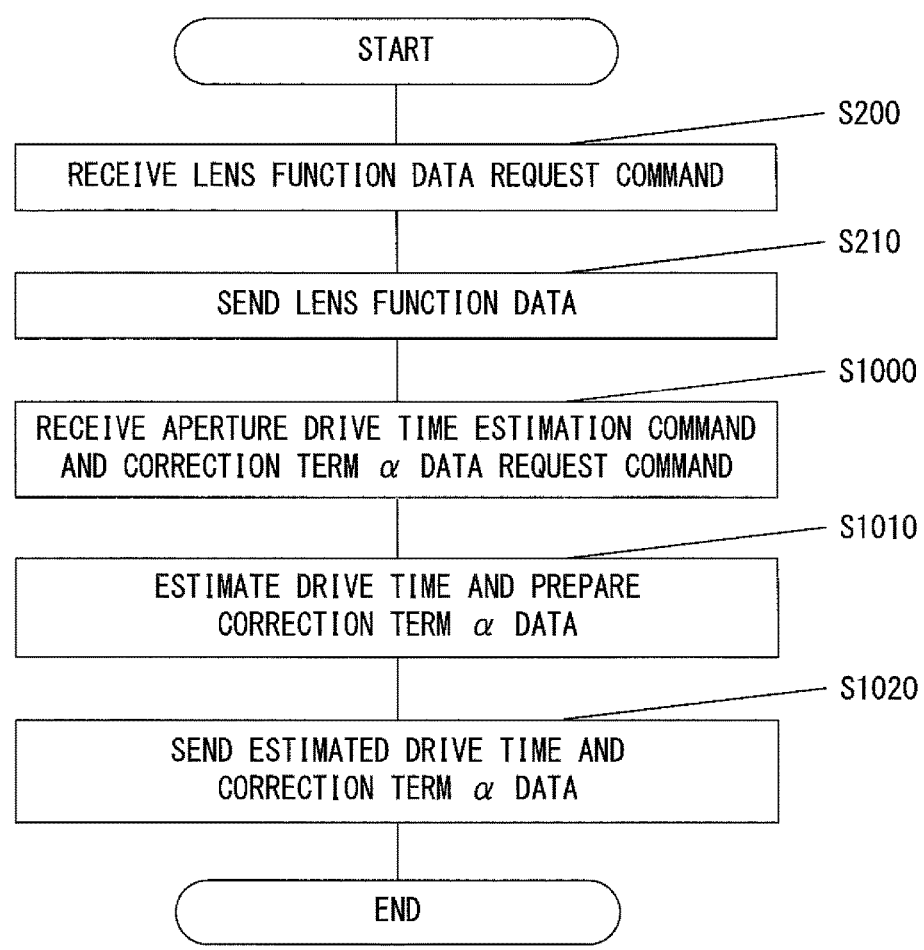
FIG. 14 shows a flowchart illustrating initialization processing executed by the first lens control device 209a according to the fourth embodiment.

FIG. 14 is a flowchart illustrating initialization processing executed by the first lens control device 209a according to the fourth embodiment. Incidentally, the processing in Steps S200 and S210 is the same as that of the lens initialization processing (FIG. 6) according to the first embodiment, so its explanation has been omitted.

In Step S1000, the first lens control device 209a receives the "aperture drive time estimation command" and the "correction term α data request command" from the body control device 109 (corresponding to Step S900 in FIG. 13). In Step S1010 in the same manner as in Step S410 in FIG. 8, the first lens control device 209a estimates and calculates the drive time of the aperture 206 (or calculates the estimated drive time T) based on the parameters (the aperture driving amount a and the aperture drive speed v) included in the received aperture drive time estimation command and the lens data (the operation expression (1) and the numerical value data of the correction term α) stored in the lens-side ROM 210. In Step S1020, the first lens control device 209a sends the estimated drive time T calculated in Step S1010 to the body control device 109 (corresponding to Step S910 in FIG. 13).

The camera system according to the aforementioned fourth embodiment can achieve the following operations and effects. (1) Since the safety or stability of data stored in the lens-side ROM 210 can be judged without making the body-side ROM 112 retain the correction term α data of the plurality of interchangeable lenses, it is possible to simplify the hardware configuration of the camera body side.

The following variations are also within the scope of the present invention and one or more variations can be combined with the aforementioned embodiments.

(Variation 1)

Each of the aforementioned embodiments described the example where the present invention is applied to the lens data about driving of the aperture 206 which can be moved so as to change the size of the opening through which the light flux passes; however, the present invention can also be applied to other driven members. For example, the present invention may be applied to lens data about driving of the focusing lens 204 which can be moved in a direction of the optical axis X of the optical system. Specifically speaking, the first interchangeable lens 200a may be configured so as to be capable of estimating the drive time of the focusing lens 204 and the lens data about driving of the focusing lens 204 may be stored in the lens-side ROM 210. Furthermore, a shake correction lens that corrects image blurs of a subject image (lens capable of moving in a direction including a component perpendicular to the optical axis X) can be added to the first interchangeable lens 200a and the present invention can be applied to this shake correction lens.

(Variation 2)

In the first embodiment, only some part of the lens data may be generated as the lens-side judgment data and sent to the camera body 100 without sending all pieces of the lens data to the camera body 100 as the lens-side judgment data. For example, if the lens data includes an operation expression to estimate the drive time of the aperture 206 and its correction term, only the operation expression may be generated and sent as the lens-side judgment data. In this case, all what is needed is to store only the operation expression in the body-side ROM 112 in the camera body 100.

Furthermore, the lens-side judgment data may be data other than the operation expression or the correction term of the aforementioned estimated drive time. For example, it may be a parameter other than the correction term given to the operation expression of the estimated drive time or may be data representing a unit of drive control of the aperture 206 (driving unit of the aperture drive unit 208) (for example, the number of aperture drive steps as indicated by data "1 LSB"). Furthermore, it may be data representing whether the lens data is stored in the lens-side ROM 210 or not.

(Variation 3)

Timing to store the body-side judgment data in the body-side ROM 112 in the camera body 100 may be, for example, when the relevant camera body 100 is manufactured or when the relevant interchangeable lens is mounted on the camera body 100 for the first time. In the latter case, normal lens-side judgment data is stored at the first time the interchangeable lens is mounted; and then every time the interchangeable lens is mounted, the lens data judgment is performed.

(Variation 4)

In each of the aforementioned embodiments, the lens data judgment is performed during the initialization processing; however, the present invention is not limited to such embodiment. For example, the lens data judgment may be performed every certain period of time when the digital camera 1 is in the power-on state; or the lens data judgment may be performed every time photographing is performed.

(Variation 5)

When the two estimated drive times are compared in the second embodiment, these two values should not necessarily be strictly identical. For example, an error may occur in these two estimated drive times depending on floating-point arithmetic precision. So, if the difference between the two estimated drive times is equal to or less than a specified threshold value, they may be determined to be identical.

(Variation 6)

In the second embodiment, the lens control device 209a performs simplified calculation of the aperture drive time by using the common operation expression; however, the system may be configured so that the simplified aperture drive estimated time T' is calculated without using an operation expression like the one mentioned above, but using a table (for example, a two-dimensional table whose parameters are the aperture driving amount a and the aperture drive speed v). In this case, the body control device 109 should be configured to include a table of the same content as this calculation table.

(Variation 7)

In each of the aforementioned embodiments when the fourth control mode is set (when it is determined that the lens data is not properly stored), the photographing operation and other processing are executed without sending the aperture drive command to the first lens control device 209a and by keeping an opening diameter of the aperture 206 fixed; however, different operation from that of each embodiment may be adopted when the lens data is not properly stored. For example, driving of the aperture may be performed without designating the drive speed of the aperture 206 (by sending the aperture drive command which does not include the parameter for the drive speed) (that is, the setting of the "second control mode" in the aforementioned embodiments may be set), or power supply to the interchangeable lens may be stopped or photographing using the relevant interchangeable lens may be prohibited.

(Variation 8)

In place of the simplified aperture drive time estimation command sent by the body control device 109 when performing the judgment in the second embodiment, a command same as the aperture drive time estimation command used for photographing may be used. Specifically speaking, if the operation expression (1) and correction term α same as the operation expression (1) and the correction term α stored in the lens-side ROM 210 in the interchangeable lens 200 mounted on the body mount unit are stored in the body-side ROM 112 in advance, the same judgment as that in the second embodiment can be performed without separately using the simplified common operation expression (or without storing it in the ROMs of both sides).

(Variation 9)

In each of the aforementioned embodiments, the lens control device 209a calculates the aperture drive time T by using the operation expression (1) and the correction term α; however, the system may be configured so that the aperture drive estimated time T is calculated without using an operation expression like the one mentioned above, but by using a table (for example, a two-dimensional table whose parameters are the aperture driving amount a and the aperture drive speed v and in which the correction term α is added in advance to numerical values in the table).

(Variation 10)

The aforementioned third embodiment is configured so that if the estimated drive time as a response to the aperture drive time estimation command A is smaller (or shorter) than the estimated drive time as a response to the aperture drive time estimation command B, it is determined that the first lens control device 209a has successfully estimated the drive time of the aperture 206 (that is, the lens data is properly stored in the lens-side ROM 210). However, the judgment of this size relation may be reversed. Specifically speaking, the body control device 109 may set the aperture driving amount of the aperture drive time estimation command A to be larger than the aperture driving amount of the aperture drive time estimation command B and then judge whether the first estimated drive time is larger than the second estimated drive time or not (if the first estimated drive time is larger than the second estimated drive time, that means the first lens control device 209a has successfully estimated the drive time of the aperture 206, that is, the lens data is properly stored in the lens-side ROM 210).

(Variation 11)

The above-described third embodiment and Variation 10 are configured so that the first lens control device 209a calculates the estimated drive times respectively in response to the aperture drive time estimation commands A and B from the body control device 109 and sends the calculated estimated drive times to the body control device 109. Furthermore, the body control device 109 is configured to compare the two estimated drive times received from the lens control device 209a and identifies which one is larger/smaller than the other. However, the body control device 109 does not necessarily have to receive the two estimated drive times or perform the comparison operation, but all what is needed is to find the size relation between the two estimated drive times (Time A and Time B) ("Time A<Time B" in the third embodiment and "Time A>Time B" in Variation 10). Therefore, the system may be configured so that after calculating the two estimated drive times, the lens control device 209a itself compares the size relation between the two estimated drive times and sends information indicating the comparison result (information indicating the size relation between the two calculated estimated drive times, for example, information indicating "Time A<Time B" in the third embodiment and information indicating "Time A>Time B" in Variation 10) to the body control device 109.

(Variation 12)

In the above-described second embodiment, the body control device 109 also independently estimates the aperture drive time in a simplified manner by using the aforementioned "common operation expression." However, instead of performing the simplified estimation (calculation) using the aforementioned "common operation expression," the body control device 109 may calculate the aforementioned "simplified estimated drive time T'" by using table information (described later) (the body-side data) stored in the body-side ROM 112 in advance. Specifically speaking, the table information (the body-side data) composed of desired parameters (combinations of a desired aperture driving amount a and a desired aperture drive speed v) and the "simplified estimated drive time T'" corresponding to each of such combinations may be stored in the body-side ROM 112. Then, the body control device 109 selects the "simplified estimated drive time T'" which is to be used as a comparison target corresponding to the desired parameters (the aperture driving amount a and the aperture drive speed v) to be sent as a command to the lens side, from the table information. Then, the body control device 109 compares the "simplified estimated drive time T'" sent from the lens control device 209a with the "simplified estimated drive time T'" selected from the aforementioned table information. Subsequent processing is the same as that in the aforementioned second embodiment. As a result, the body control device 109 can compare the "simplified estimated drive times T'" without performing calculation by using the common operation expression.

Variation 12 which is a variation of the second embodiment will be explained below with reference to FIG. 15 and FIG. 16. Incidentally, in the following explanation, the same reference numerals as those in the second embodiment are assigned to the same elements as those in the second embodiment and an explanation about them has been omitted.

Figure 15:
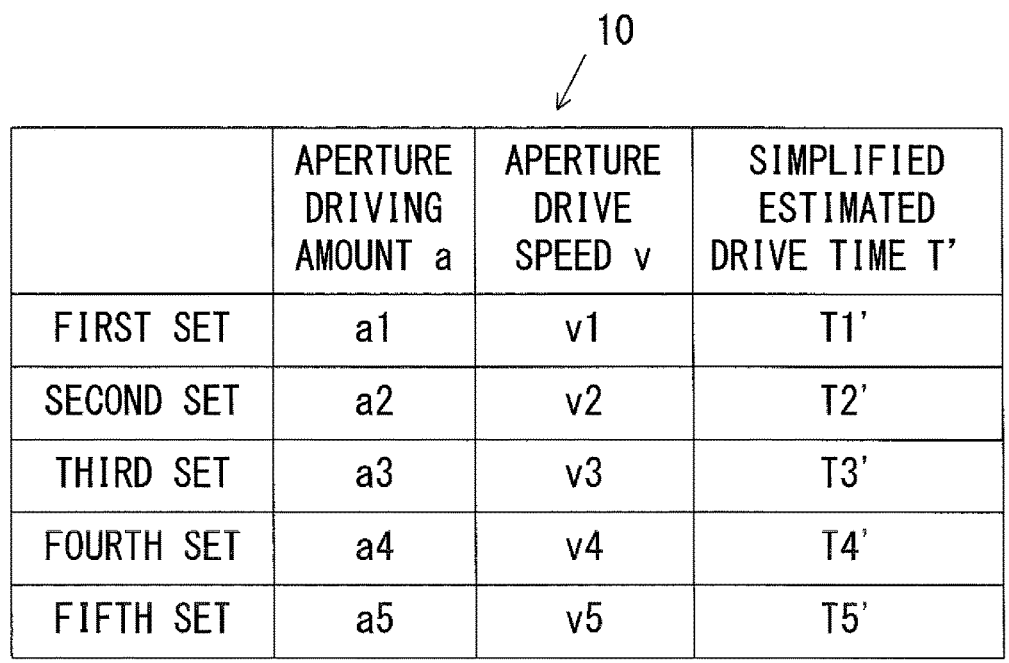
FIG. 15 shows the stored content of a body-side ROM according to a variation.

FIG. 15 shows an example of table information stored in the body-side ROM 112. The body-side ROM 112 stores table information 10 instead of the "simplified operation expression (2) "T'=a/v" described earlier. The table information 10 contains a plurality of sets (five sets in FIG. 16) of parameters including the aperture driving amount a and the aperture drive speed v, which are associated with simplified estimated drive time T'. In the following explanation, this set will be referred to as the parameter set (the body-side data). Incidentally, simplified estimated drive times T1' to T5' indicated in FIG. 15 are, for example, values each calculated in advance by assigning one of the aperture driving amounts a1 to a5 and one of the aperture drive speeds v1 to v5 which are indicated in FIG. 15 to the aforementioned "simplified operation expression (2)" stored in advance in, for example, a computer installed at a factory manufacturing this camera system. This table information is stored in the body-side ROM 112 at the time of, for example, factory shipment.

Figure 16:
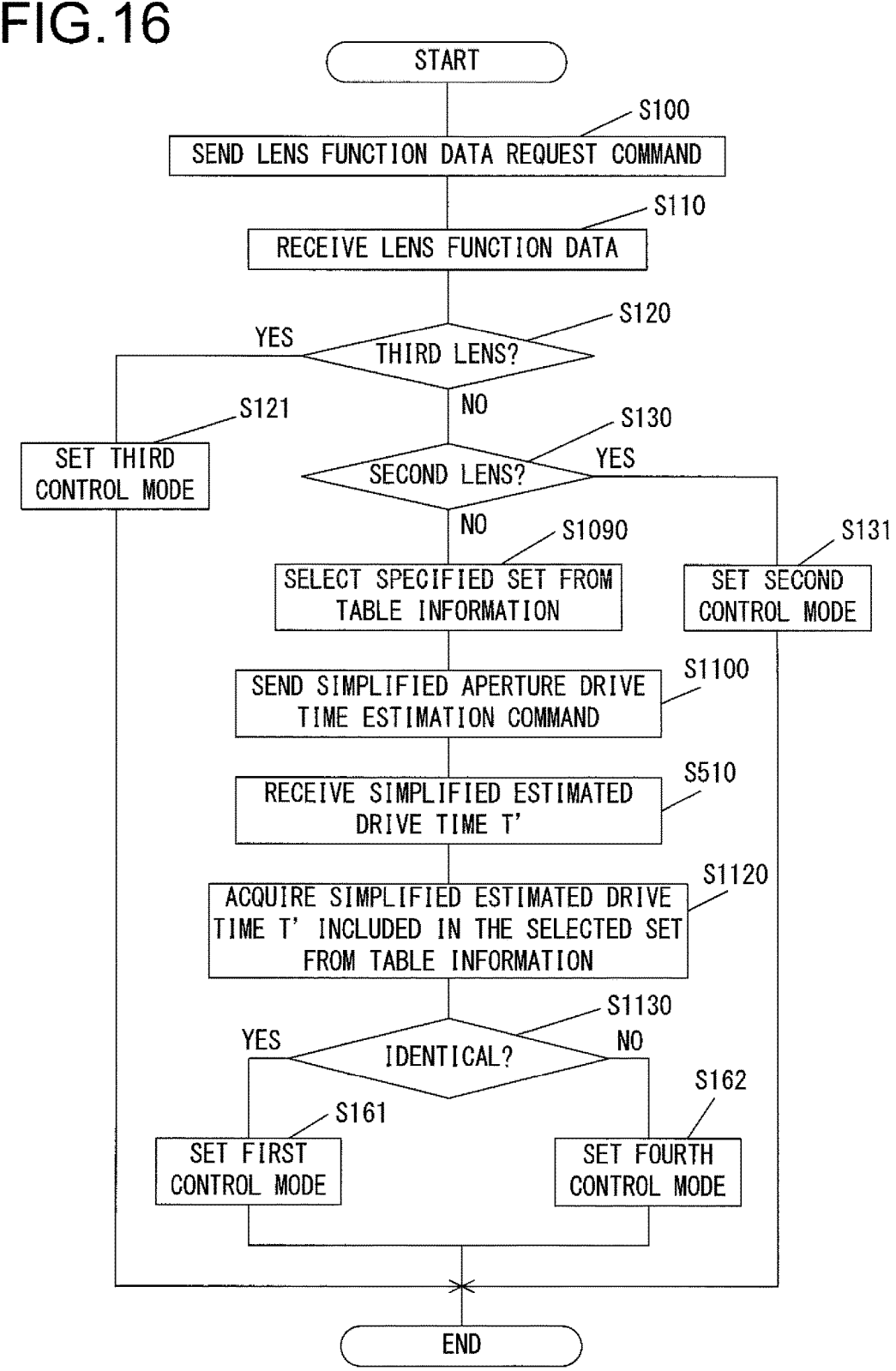
FIG. 16 shows a flowchart illustrating initialization processing executed by the body control device 109 according to the variation.

FIG. 16 is a flowchart illustrating initialization processing executed by the body-side control device 109 according to Variation 12. Incidentally, the operation from Step S100 to S130 is the same as that of the flowchart shown in FIG. 9, so its explanation has been omitted.

When the first interchangeable lens 200a is mounted on the camera body 100, the body-side control device 109 makes a negative judgment in Step S130 and the processing proceeds to Step S1090. In Step S1090, the body control device 109 selects any one of the parameter sets from the table information 10 stored in the body-side ROM 112.

In subsequent Step S1100, the body control device 109 sends the simplified aperture drive time estimation command to the first lens control device 209a. This command contains the aperture driving amount and the aperture drive speed of the parameter set selected in Step S1090. For example, if the first set is selected in Step S1090, the command sent in Step S1100 contains the aperture driving amount a1 and the aperture drive speed v1.

Next in Step S510, the body control device 109 receives the simplified estimated drive time T' calculated by the first lens control device 209a from the first lens control device 209a. This estimated drive time T' is a value calculated by the first lens control device 209a by assigning the aperture driving amount and the aperture drive speed, which are contained in the command sent in Step S1100, to the aforementioned simplified operation expression (2). For example, if the first set is selected in Step S1090, the first lens control device 209a calculates the simplified estimated drive time T' by using the aperture driving amount a1 and the aperture drive speed v1.

Then, in Step S1120, the body control device 109 acquires the simplified estimated drive time T' included in the parameter set selected in Step S1090 from the table information 10. For example, if the first set is selected in Step S1090, the simplified estimated drive time T1' included in that first set is acquired in Step S1120. Subsequently, in Step S1130, the body control device 109 judges whether the simplified estimated drive time T' received in Step S510 and the simplified estimated drive time T' (for example, T1') acquired in Step S1120 are identical or not. If these two values are identical, the processing proceeds to Step S161 and the body control device 109 sets the control mode of the camera body 100 to the first control mode mentioned earlier. On the other hand, if the two values are not identical in Step S1130, the processing proceeds to Step S162 and the body control device 109 sets the aforementioned fourth control mode to the camera body 100.

Incidentally, in this Variation 12, the operation of the first lens control device 209a is the same as that illustrated in the flowchart of FIG. 10, so that its explanation has been omitted.

Meanwhile, in Variation 12 described above, the simplified operation expression (2) "T'=a/v" is used as an operation expression when the simplified estimated drive times T1' to T5' in the table information 10 are calculated in advance and when the simplified estimated drive time T' to be received from the interchangeable lens is calculated at the interchangeable lens in Step S510 of FIG. 16. However, it is also possible to employ the configuration so as to use the aforementioned operation expression (1) "T=a/v+α (T=a+ a/v)" instead of this simplified operation expression (2).

Variation 12 has described the example in which the table information 10 includes the five parameter sets, that is, the first to fifth sets; however, the number of the parameter sets is not limited to five and may be more or less than five. For example, the table information 10 may include only one parameter set. However, if two or more parameter sets are included in the table information 10, the two or more parameter sets can be sequentially sent to the interchangeable lens and the simplified estimated drive time T' can be checked for each of the parameter sets, so that the safety check effect of the lens data stored in the lens-side ROM 210 can be enhanced. Therefore, the table information 10 should preferably include a plurality of parameter sets.

(Variation 13)

In each of the aforementioned embodiments and each of the variations regarding control at the camera body, the body control device performs the judgment operation only once (for example, Step S160 in FIG. 5, Step S530 in FIG. 9, and Step S1130 in FIG. 15) to judge whether to set the aforementioned first control mode or to set the aforementioned fourth control mode. The camera body may be configured to perform this judgment more than once. Alternatively, this judgment operation may be performed once and the first or fourth control mode may be set, and then this judgment may be performed again at specified timing (for example, when re judgment is requested or a specified period of time has elapsed since the last judgment). Furthermore, this judgment may be performed repeatedly in every specified cycle.

Incidentally, when this re judgment is to be performed, the camera body requests the interchangeable lens to send the lens-side judgment data to the camera body again and the camera body operates to prepare the data for comparison with the lens-side judgment data again. Referring to the example of FIG. 15, the operation is performed to repeat the operation from Step S1090 to Step S1130 again.

The present invention is not limited to the above-described embodiments unless features of the present invention are impaired; and other embodiments which are conceivable within the range of technical ideas of the present invention are also included within the scope of the present invention.

The disclosure of the following priority application is herein incorporated by reference: Japanese Patent Application No. 2012-191979 filed on Aug. 31, 2012; and Japanese Patent Application No. 2012-269590 filed on Dec. 10, 2012.

REFERENCE SIGNS LIST 100 camera body; 101 body mount unit; 102, 202 pluralities of electric contacts; 103 quick return mirror; 104 image sensor; 105 sub-mirror; 106 focal point detector; 107 finder screen; 108 pentaprism; 109 body control device; 110 ocular lens; 111 body side aperture drive unit; 112, 210 ROMs; 120 release switch; 200a first interchangeable lens; 200b second interchangeable lens; 200c third interchangeable lens; 201 lens mount unit; 204 focusing lens; 206 aperture; 207 lens drive unit; 208 aperture drive unit; 209a first lens control device; 209b second lens control device; and 209c third lens control device.

The invention claimed is:

1. A camera body comprising:
a mount on which an interchangeable lens including a driven member and a storage medium storing lens data related to driving of the driven member can be mounted;
a receiver that receives lens-side judgment data, based on which whether the lens data is properly stored in the storage medium or not can be judged, from the interchangeable lens;
a processor configured to judge whether the lens data is properly stored in the storage medium or not, based on the lens-side judgment data received from the receiver; and
a storage device that stores body-side data to be compared with the lens-side judgment data received from the receiver, wherein:
the receiver receives drive time, which is required to drive the driven member by a desired driving amount at a desired drive speed and is estimated by the interchangeable lens based on the lens data, as the lens-side judgment data from the interchangeable lens;

the processor performs the judgment based on the body-side data and the lens-side judgment data received from the receiver; and the body-side data comprises data associating information about drive time required to drive the driven member by a desired driving amount at a desired drive speed with the desired drive speed and the desired driving amount.

2. The camera body according to claim 1, wherein:
the storage device stores a plurality of pieces of the body-side data which are mutually different; and
the processor selects one of the plurality of pieces of the body-side data stored in the storage device and performs the judgment by comparing the information about the drive time included in the selected body-side data with the received lens-side judgment data.

3. A camera body comprising:
a mount on which an interchangeable lens including a driven member and a storage medium storing lens data related to driving of the driven member can be mounted;
a receiver that receives lens-side judgment data, based on which whether the lens data is properly stored in the storage medium or not can be judged, from the interchangeable lens;
a processor configured to judge whether the lens data is properly stored in the storage medium or not, based on the lens-side judgment data received from the receiver; and
a storage device that stores body-side data which is partially identical to the lens data stored in the storage medium, wherein:
the receiver receives drive time, which is required to drive the driven member by a desired driving amount at a desired drive speed and is estimated by the interchangeable lens based on the lens data, as the lens-side judgment data from the interchangeable lens;
the processor is configured to estimate drive time required to drive the driven member by the desired driving amount at the desired drive speed based on the body-side data stored in the storage device; and
the processor judges whether the lens data is properly stored in the storage medium or not by comparing the drive time estimated by the processor with the lens-side judgments data received from the receiver.

4. The camera body according to claim 3, wherein:
the storage device stores the lens data including an operation expression of the drive time.

5. A camera body comprising:
a mount on which an interchangeable lens including a driven member and a storage medium storing lens data related to driving of the driven member can be mounted;
a receiver that receives lens-side judgment data, based on which whether the lens data is properly stored in the storage medium or not can be judged, from the interchangeable lens;
a processor configured to judge whether the lens data is properly stored in the storage medium or not, based on the lens-side judgment data received from the receiver; and
a storage device that stores body-side data to be compared with the lens-side judgment data received from the receiver, wherein:
the receiver receives drive time, which is required to drive the driven member by a desired driving amount at a desired drive speed and is estimated by the interchangeable lens based on the lens data, as the lens-side judgment data from the interchangeable lens;
the processor performs the judgment based on the body-side data and the lens-side judgment data received from the receiver;
the storage device stores an operation expression same as an operation expression stored in the storage medium to calculate the drive time;
the receiver receives at least part of correction term data, which is stored in the storage medium and given to the operation expression to calculate the drive time, from the storage medium;
the processor calculates the drive time based on the correction term data received from the receiver and the operation expression; and
the processor performs the judgment based on the drive time calculated by the processor and the lens-side judgment data received by the receiver.

6. A camera body comprising:
a mount on which an interchangeable lens including a driven member and a storage medium storing lens data related to driving of the driven member can be mounted;
a receiver that receives lens-side judgment data, based on which whether the lens data is properly stored in the storage medium or not can be judged, from the interchangeable lens; and
a processor configured to judge whether the lens data is properly stored in the storage medium or not, based on the lens-side judgment data received from the receiver, wherein:
the receiver receives drive time, which is required to drive the driven member by a desired driving amount at a desired drive speed and is estimated by the interchangeable lens based on the lens data, as the lens-side judgment data from the interchangeable lens;
the receiver receives a plurality of drive times as the lens-side judgment data, each of the plurality of drive times corresponding to the drive time; and
the processor performs the judgment based on a size relation between the plurality of drive times received by the receiver.

7. An interchangeable lens, comprising:
a mount on which a camera body can be mounted;
a communication device that performs communication with the camera body;
a driven member;
a controller that controls the driven member; and
a storage device that stores a first lens data and a second lens data that includes a part of the first lens data, the first lens data and the second lens data are related to control of the driven member by the controller; wherein:
after the controller receives driving amount information and drive speed information for the driven member from the camera body via the communication device, the controller sends a first data based on the second lens data, the driving amount information and the drive speed information to the camera body via the communication device before sends a second data based on the first lens data, the driving amount information and the drive speed information to the camera body.

8. The interchangeable lens according to claim 7, wherein:
the controller calculates the drive time by using an operation expression as the second lens data, the driving amount information and the drive speed information, and sends the calculated drive time to the camera body as the first data.

9. An interchangeable lens, comprising:

a mount on which a camera body can be mounted;

a communication device that performs communication with the camera body;

a member capable of moving so as to change a size of an opening through which a light flux passes;

a driver configured to drive the member;

a controller that controls the driver; and a storage device that stores a first lens data and a second lens data that includes a part of the first lens data, the first lens data and the second lens data are related to control of the member by the controller; wherein:

after the controller receives driving amount information and drive speed information for the member from the camera body via the communication device, the controller sends a first data based on the second lens data, the driving amount information and the drive speed information to the camera body via the communication device before sends a second data based on the first lens data, the driving amount information and the drive speed information to the camera body.

\* \* \* \* \*